United States Patent [19]
Uesugi

[11] Patent Number: 5,491,393
[45] Date of Patent: Feb. 13, 1996

[54] DRIVE CONTROL APPARATUS FOR BRUSHLESS DC MOTOR AND DRIVING METHOD THEREFOR

[75] Inventor: Michika Uesugi, Fuji, Japan

[73] Assignee: Kabushiki Kaisha Toshiba, Kawasaki, Japan

[21] Appl. No.: 214,845

[22] Filed: Mar. 18, 1994

[30] Foreign Application Priority Data

Aug. 25, 1993 [JP] Japan ................................. 5-210708

[51] Int. Cl.⁶ ............................................. H01R 39/46
[52] U.S. Cl. ...................... 318/439; 318/138; 318/254; 318/811; 318/807
[58] Field of Search ............................ 318/138, 439, 318/254, 811, 807, 599

[56] References Cited

U.S. PATENT DOCUMENTS

| | | | |
|---|---|---|---|
| 5,041,768 | 8/1991 | Herrmann | 318/138 |
| 5,079,487 | 1/1992 | Malang | 318/254 |
| 5,086,261 | 2/1992 | Sakata et al. | 318/811 |
| 5,170,108 | 12/1992 | Peterson et al. | 318/469 |
| 5,264,775 | 11/1993 | Namuduri et al. | 318/811 |

FOREIGN PATENT DOCUMENTS

| | | |
|---|---|---|
| 113318 | 3/1989 | Japan . |
| 2142383 | 5/1990 | Japan . |
| 2076566 | 12/1981 | United Kingdom . |
| 2176068 | 12/1986 | United Kingdom . |
| 2243504 | 10/1991 | United Kingdom . |
| 2264405 | 8/1993 | United Kingdom . |

*Primary Examiner*—William M. Shoop, Jr.
*Assistant Examiner*—Karen Masih
*Attorney, Agent, or Firm*—Cushman Darby & Cushman

[57] ABSTRACT

A switching circuit including three series circuits each having a pair of switching elements series-connected on the upstream side and downstream side with respect to current flow, each of the connection nodes between the paired switching elements of the series circuits being connected to a corresponding one of the phase windings. A DC voltage output from a DC voltage circuit is applied to the series circuits of the switching circuit. One of the upstream side switching element in one of the series circuits of the switching circuit and the downstream side switching element in a different one of the series circuits is continuously set in the ON state, the other switching element is intermittently turned ON, and the switching elements to be turned ON are sequentially changed so as to sequentially energize the phase windings of a brushless DC motor. In this case, the switching element, which is one of the switching elements to be turned ON and which has been set in the ON state, is forcedly continuously set in the ON state for a initial preset period of time and one of the switching elements which is newly turned ON is forcedly intermittently turned ON for the initial preset period of time.

4 Claims, 15 Drawing Sheets

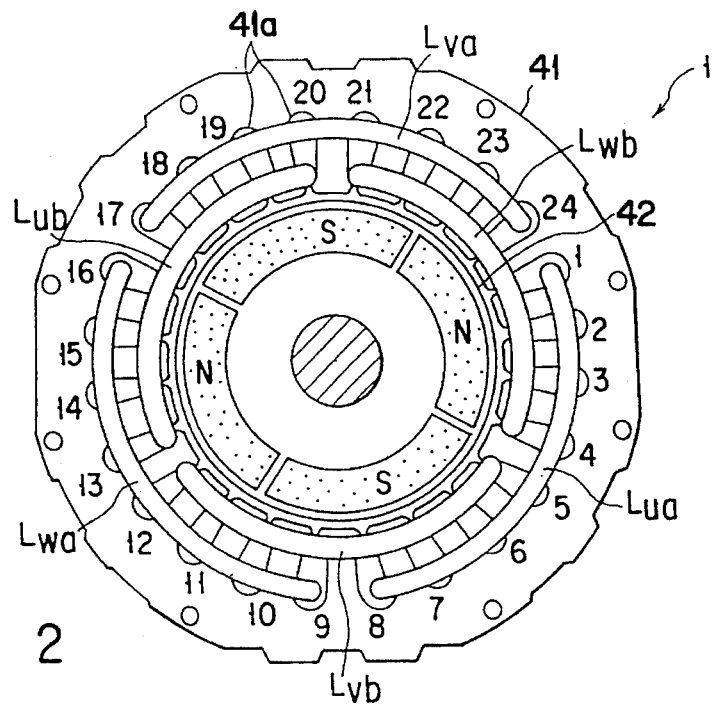
FIG. 2
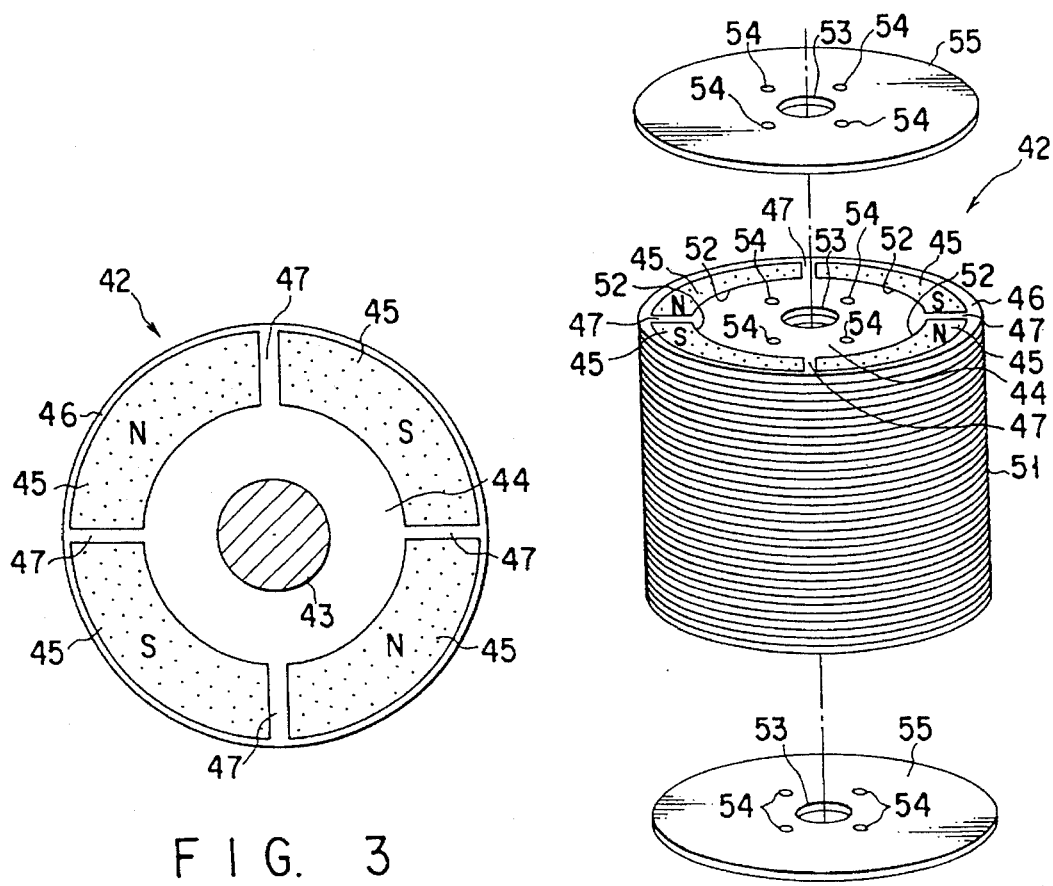
FIG. 3
FIG. 4

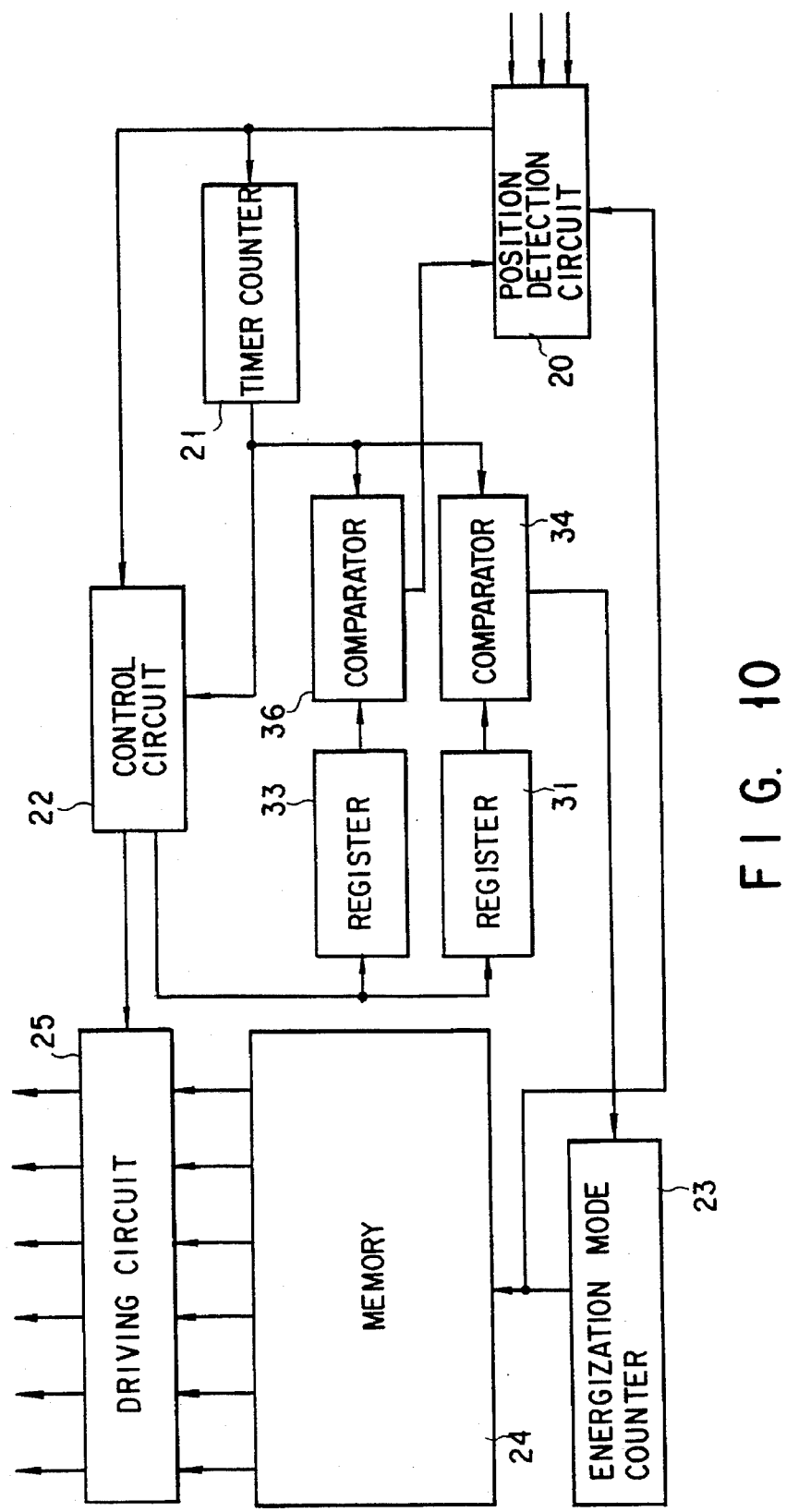
F I G. 10

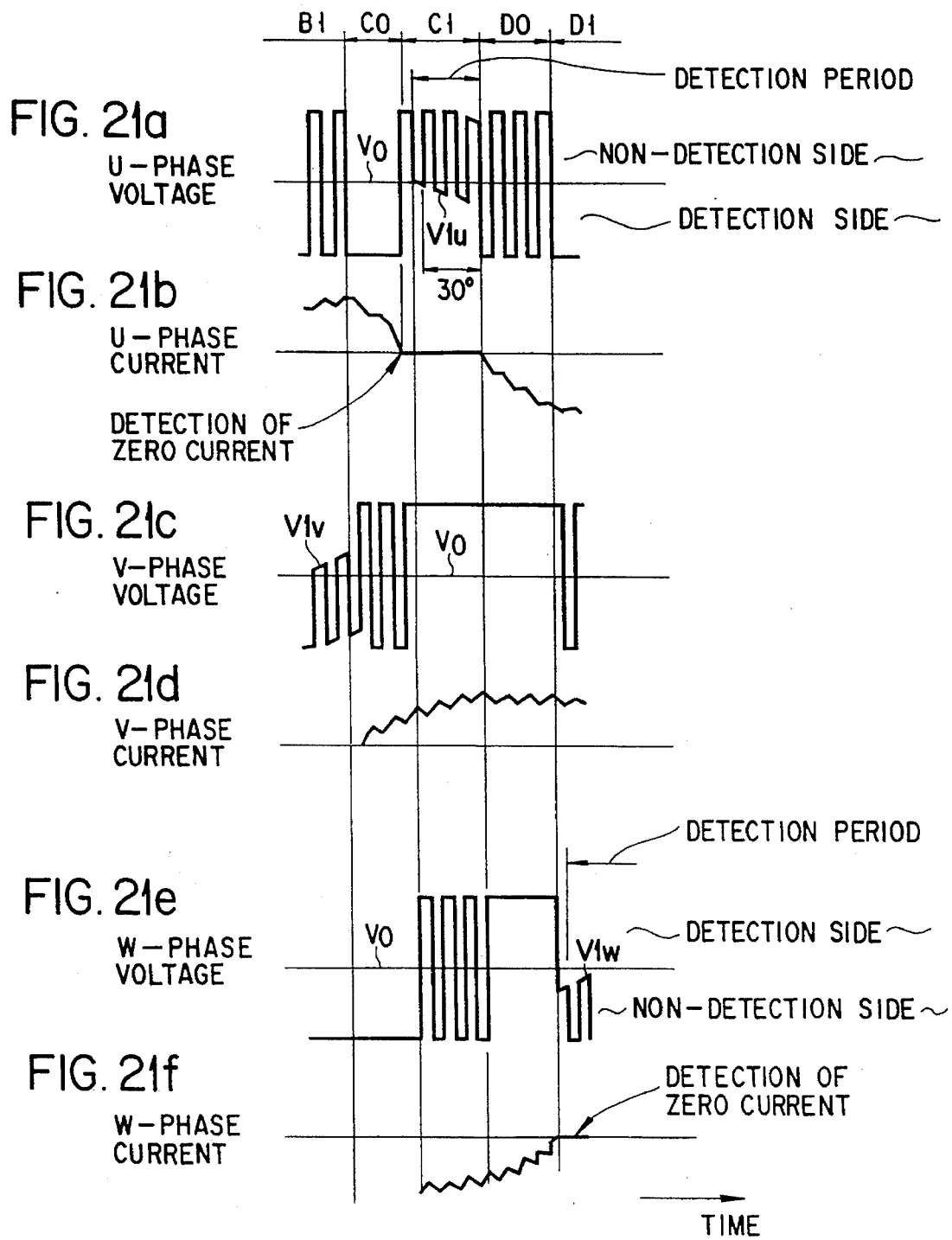

DRIVE CONTROL APPARATUS FOR BRUSHLESS DC MOTOR AND DRIVING METHOD THEREFOR

BACKGROUND OF THE INVENTION

1. Field of the Invention

This invention relates to a drive control apparatus for a brushless DC motor mounted on a compressor or the like and a method for driving the brushless DC motor.

2. Description of the Related Art

A brushless DC motor includes a stator having three phase windings and a rotor having permanent magnets.

When the brushless DC motor is driven, a DC voltage circuit for outputting a DC voltage and a switching circuit receiving the output voltage of the DC voltage circuit are used.

The switching circuit has three series circuits each having a pair of switching elements series-connected on the upstream side and downstream side with respect to current flow. Each of the connection nodes between the paired switching elements of the series circuits is connected to a corresponding one of the phase windings of the brushless DC motor.

The respective phase windings of the brushless DC motor are sequentially energized by continuously setting one of the upstream side switching element of one of the series circuits of the switching circuit and the downstream side switching element of a different one of the series circuits in the ON state, intermittently turning ON the other switching element and sequentially changing the switching elements to be turned ON. Energization of the respective phase windings generates magnetic fields from the respective phase windings. Interaction between the thus generated magnetic fields and the magnetic fields created by the permanent magnets of the rotor rotates the rotor. Switching of the energization of the respective phase windings is called commutation.

When the rotor is rotated, a voltage is induced in a phase winding which is not energized. The induced voltage is derived out and the rotation position of the rotor is detected based on a variation in the induced voltage. The timing of energization switching (commutation) for each phase winding is controlled according to the detected rotation position. The energization switching is repeatedly effected to continuously rotate the rotor.

One example of the driving control for the brushless DC motor is disclosed in Japanese Patent Specification No. H.1-13318 and Japanese Patent Disclosure No. H.2-142383.

In the example in Japanese Patent Specification No. H.1-13318, an inverter (4) is driven to sequentially energize the respective phase windings of a brushless motor (5). Then, the rotation position of a rotor (6) is detected by use of position detectors (71, 72, 73). Energization of each phase winding is controlled in a period of 120 electrical degrees according to the detected rotation position. In the energization of the period of 120 electrical degrees, energization of a front half period of 60 electrical degrees is continuously effected and energization of a latter half period of 60 electrical degrees is intermittently effected (subjected to the pulse-width modulation).

In the example in Japanese Patent Disclosure No. H.2-142383, a semiconductor switching element (2) is driven to sequentially energize the respective phase windings of a brushless motor (1). Then, a voltage induced in each phase winding is sampled and fetched by a microcomputer (5) and processed in the microcomputer (5) so as to detect the rotation position of a rotor of the brushless motor (1). Energization of each phase winding is controlled according to the detected rotation position.

At the time of switching of energization of the phase windings of the brushless DC motor, a counter electromotive force is generated in a phase winding whose energization is to be interrupted. When the counter electromotive force is generated, a current will flow from the switching circuit to the DC voltage circuit. The reverse flow of current reduces the service life of the electrical parts of the DC voltage circuit and at the same time reduces the rotation torque of the brushless DC motor. If the rotation torque of the brushless DC motor is reduced, the operation efficiency of the brushless DC motor is lowered and large noises and vibration are generated from the brushless DC motor.

SUMMARY OF THE INVENTION

An object of this invention is to prevent the reverse flow of current from the switching circuit to the DC voltage circuit so as to increase the service life of electrical parts of the DC voltage circuit and at the same time suppress a reduction in the rotation torque of the brushless DC motor, thereby enhancing the operation efficiency of the brushless DC motor and suppressing generation of large noises and vibration of the brushless DC motor.

According to this invention, the above object can be attained by a drive control apparatus for a brushless DC motor which includes a stator having three phase windings and a rotor having magnets. The drive control apparatus comprises a switching circuit including three series circuits each having a pair of switching elements series-connected on the upstream side and downstream side with respect to current flow, each of the connection nodes between the paired switching elements of the series circuits being connected to a corresponding one of the phase windings; a DC voltage circuit outputting a DC voltage to the series circuits of the switching circuit; first control means for sequentially energizing the phase windings by continuously setting one of the switching element on the upstream side in one of the series circuits of the switching circuit and the switching element on the downstream side in a different one of the series circuits in the ON state, intermittently turning ON the other switching element and sequentially changing the switching elements to be turned ON; second control means for forcedly continuously setting the switching element, which is one of the switching elements to be turned ON by the first control means and which has been set in the ON state, in the ON state for a first preset initial period of time and forcedly intermittently turning ON one of the switching elements which is newly turned ON for the first preset initial period of time; and third control means for controlling the ON/OFF duty of the switching element which is to be intermittently turned ON by one of the first and second control means to adjust the speed of the brushless DC motor.

According to this invention, the above object can be attained by a method for driving a brushless DC motor in an apparatus including a brushless DC motor which includes a stator having three phase windings and a rotor having magnets, and a switching circuit including three series circuits each having a pair of switching elements series-connected on the upstream side and downstream side with respect to current flow, each of the connection nodes between the paired switching elements of the series circuits being connected to a corresponding one of the respective phase windings, comprising a first step of applying a DC voltage to the series circuits of the switching circuit; a second step of turning ON/OFF the switching elements of the switching circuit to sequentially energize the phase windings for a period of 120 electrical degrees; and a third step of intermittently effecting the energization operation in a first preset period among the period of 120 electrical degrees in which the energization of the phase windings is effected in the second step, continuously effecting the energization operation in a next preset period among the period of 120 electrical degrees and intermittently effecting the energization operation in a last preset period among the period of 120 electrical degrees.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a plan view showing the structure of the brushless DC motor of one of the first and second embodiments with partly cut-away portion;

FIG. 3 is a plan view showing the structure of a rotor shown in FIG. 3;

FIG. 4 is an exploded perspective view showing the structure of the rotor of FIG. 2;

FIG. 10 is a block diagram showing the control section of FIG. 7 with part of the main portions thereof removed;

FIGS. 21a–21f are signal waveform diagrams for illustrating the operation of the second embodiment.

DETAILED DESCRIPTION OF THE PREFERRED EMBODIMENTS

There will now be described a first embodiment of this invention with reference to the accompanying drawings.

Figure 1:
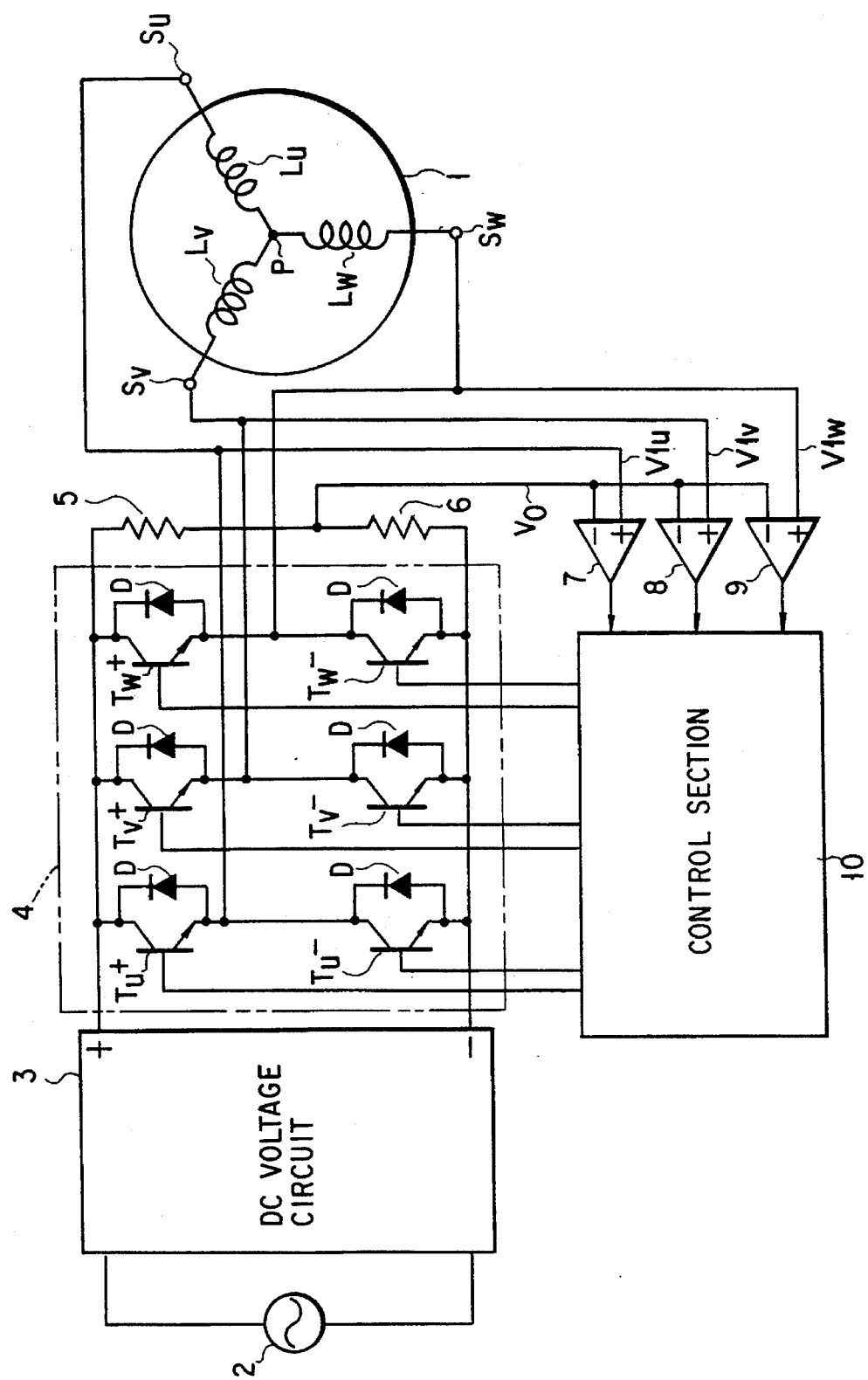
FIG. 1 is a block diagram of an electric circuit according to a first embodiment of this invention.

In FIG. 1, 1 denotes a brushless DC motor having three phase windings Lu, Lv, Lw connected in the star connection form with a neutral point P set at the center. The free ends of the three phase windings Lu, Lv, Lw are respectively connected to terminals Su, Sv, Sw.

A single-phase AC power source 2 is connected to a DC voltage circuit 3. The DC voltage circuit 3 rectifies the voltage from the single-phase AC power source 2 to output a DC voltage.

Output terminals of the DC voltage circuit 3 are connected to a switching circuit 4. The switching circuit 4 has three series circuits of U-phase, v-phase and W-phase each having a pair of switching elements series-connected on the upstream side and downstream side with respect to current flow. Each of the series circuits is applied with a DC voltage output from the DC voltage circuit 3.

The U-phase series circuit includes a transistor $T_{u+}$ which is the upstream side switching element and a transistor $T_{u-}$ which is the downstream side switching element. The V-phase series circuit includes a transistor $T_{v+}$ which is the upstream side switching element and a transistor $T_{v-}$ which is the downstream side switching element. The W-phase series circuit includes a transistor $T_{w+}$ which is the upstream side switching element and a transistor $T_{w-}$ which is the downstream side switching element. Flywheel diodes D are respectively connected in parallel with the transistors.

The connection node between the transistors $T_{u+}$ and $T_{u-}$, the connection node between the transistors $T_{v+}$ and $T_{v-}$ and the connection node between the transistors $T_{w+}$ and $T_{w-}$ are respectively connected to the terminals Su, Sv and Sw of the brushless DC motor 1.

The switching circuit 4 has a function of sequentially energizing the phase windings Lu, Lv, Lw of the brushless DC motor 1 by selectively turning ON and OFF the transistors.

The output terminal of the DC voltage circuit 3 is connected to a series circuit of resistors 5 and 6. A voltage occurring across the resistor 6 is input to the inverting input terminals (−) of comparators 7, 8 and 9 as a reference voltage Vo. The resistances of the resistors 5 and 6 are so determined that the voltage occurring across the resistor 6 will be set to one half the level of the output voltage of the DC voltage circuit 3.

A voltage $V_{1u}$ induced in the phase winding Lu is input to the non-inverting input terminal (+) of the comparator 7. A voltage $V_{1v}$ induced in the phase winding Lv is input to the non-inverting input terminal (+) of the comparator 8. A voltage $V_{1w}$ induced in the phase winding Lw is input to the non-inverting input terminal (+) of the comparator 9.

Each of the comparators 7, 8, 9 outputs a logic "0" signal when the level of the induced voltage $V_{1u}$, $V_{1v}$, $V_{1w}$ thereof is lower than the level of the reference voltage Vo and outputs a logic "1" signal when the level of an input voltage to the non-inverting input terminal (+) thereof is equal to or higher than the level of the reference voltage vo. That is, the level of each of the induced voltages $V_{1u}$, $V_{1v}$, $V_{1w}$ thereof is compared with the level of the reference voltage vo, and when the levels thereof cross each other, the logic level of the output signal of a corresponding one of the comparators 7, 8, 9 is changed.

The output signals of the comparators 7, 8, 9 are input to a control section 10. The control section 10 monitors the voltages $V_{1u}$, $V_{1v}$, $V_{1w}$ induced in the phase windings Lu, Lv, Lw via the comparators 7, 8, 9, detects the rotation position of a rotor 42 of the brushless DC motor 1, which will be described later based on variations in the induced voltages $V_{1u}$, $V_{1v}$, $V_{1w}$ and creates driving signals for the transistors of the switching circuit 4 according to the detected rotation position of the rotor 42. The driving signals are supplied to the bases of the transistors of the switching circuit 4 so as to turn ON or OFF the transistors. Two of the phase windings Lu, Lv, Lw of the brushless DC motor 1 are sequentially energized by the turn-ON/OFF of the transistors. Switching of the energization of the respective phase windings Lu, Lv, Lw is called commutation.

Next, the construction of the brushless DC motor 1 is explained.

As shown in FIG. 2, the brushless DC motor 1 includes a stator 41 and the rotor 42 which is rotatably mounted inside the stator 41.

A large number of (24) slots 41a are formed in the inner peripheral surface of the stator 41 and slot numbers from "1" to "24" identify the slots 41a. The phase windings Lu, Lv, Lw are disposed and fixed in the slots 41a with the positional deviation of 120 degrees set therebetween.

In practice, the phase winding Lu is constructed by a pair of phase windings $L_{ua}$ and $L_{ub}$ which are connected in parallel with each other. The phase windings $L_{ua}$ and $L_{ub}$ are arranged in opposed positions.

In practice, the phase winding Lv is constructed by a pair of phase windings $L_{va}$ and $L_{vb}$ which are connected in parallel with each other. The phase windings $L_{va}$ and $L_{vb}$ are arranged in opposed positions.

In practice, the phase winding Lw is constructed by a pair of phase windings $L_{wa}$ and $L_{wb}$ which are connected in parallel with each other. The phase windings $L_{wa}$ and $L_{wb}$ are arranged in opposed positions.

As shown in FIG. 3, the rotor 42 includes a yoke 44 disposed around a rotating shaft 43, a plurality of, for example, four permanent magnets 45 disposed around the yoke 44, an annular portion 46 disposed around the permanent magnets 45, and four coupling portions 47 disposed in gaps between the permanent magnets 45 to couple the yoke 44 with the annular portion 46. The coupling portions 47 have a function of magnetically coupling the yoke 44 with the annular portion 46.

As more specifically shown in FIG. 4, the yoke 44, annular portion 46 and coupling portions 47 of the rotor 42 are formed by stacking a large number of circular steel plates 51. Each of the steel plates 51 has insertion holes for reception of the permanent magnets 45 formed in the peripheral portions thereof, an insertion hole 53 for reception of the rotating shaft 43 formed in the central portion thereof, and four rivet insertion holes 54 formed in positions (corresponding to the position of the yoke 44) around the insertion hole 53. End plates 55 are disposed on the end positions in the stack direction of the steel plates 51. Each of the end plates 55 also has an insertion hole 53 for receiving the rotating shaft 43 and four rivet insertion holes 54.

Assembling of the rotor 42 is effected by first stacking the steel plates 51 and inserting the permanent magnets 45 into the respective insertion holes 52. Each of the permanent magnets 45 is formed by solidifying magnetic particles and has no magnetic polarity when it is inserted into the corresponding insertion hole 52, and the magnetic polarity thereof is not determined until the magnetizing process which will be described later is effected. After this, the end plates 55 are set in contact with the end portions of the stacked structure of the steel plates 51 and rivets (not shown) are inserted into the rivet insertion holes 54 of the end plates 55 and the steel plates 51. Then, both ends of the rivets are caulked so as to fix the whole rotor 42.

Figure 5:
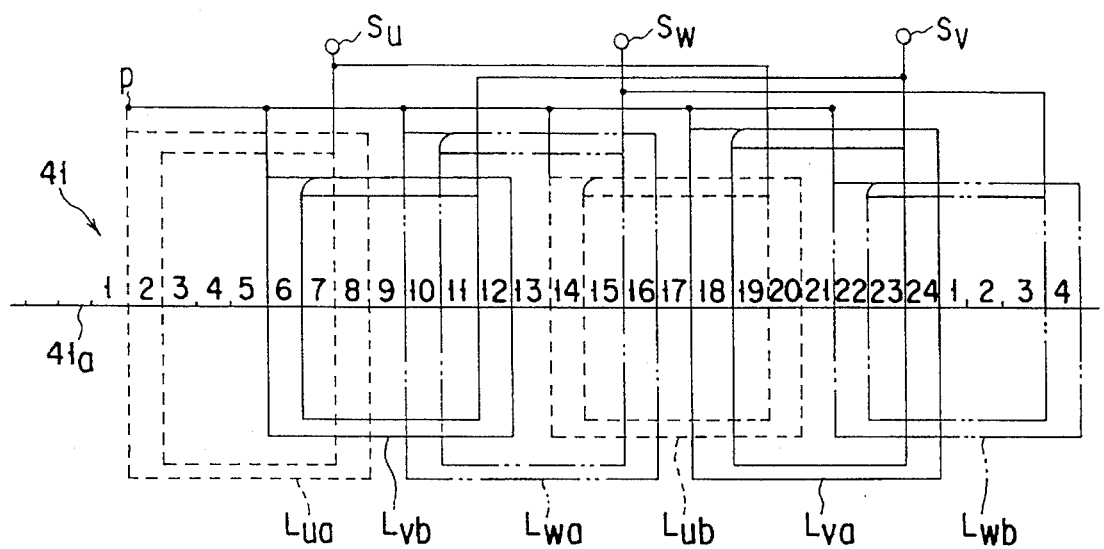
FIG. 5 shows the respective phase windings mounted on a stator shown in FIG. 3.

Connections of the phase windings $L_{ua}$, $L_{ub}$, $L_{va}$, $L_{vb}$, $L_{wa}$ and $L_{wb}$ are shown in FIG. 5.

Figure 6:
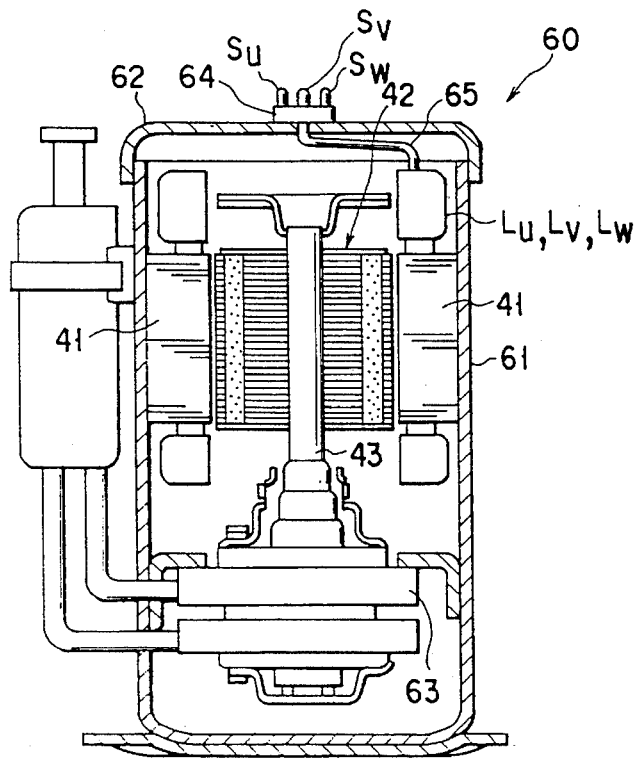
FIG. 6 is a cross sectional view showing the structure of a compressor having the brushless DC motor of one of the first and second embodiments incorporated therein.

For example, as shown in FIG. 6, the brushless DC motor 1 with the above structure is mounted on a compressor 60 for an air-conditioner.

The outer appearance of the compressor 60 is constructed by a casing 61 and a cover 62 which closes the upper opening of the casing 61. In the casing 61, a compressor 63 is disposed on the bottom portion thereof and the brushless DC motor 1 is disposed in position above the compressor 63.

A terminal board 64 is mounted on the upper surface of the cover 62 and the terminals Su, Sv, Sw are provided on the terminal board 64. The terminals Su, Sv, Sw are connected to the phase windings Lu, Lv, Lw in the casing 61 via an electric cable 65.

The terminals Su, Sv, Sw of the terminal board 64 are connected to the output terminals of the switching circuit 4 via a connector and electric cable when the manufacturing process of the compressor 60 is completed.

The control section 10 performs the following functions.

[1] The control section sequentially energizes the phase windings Lu, Lv, Lw by continuously setting one of the upstream side switching element of one of the series circuits of the switching circuit and the downstream side switching element of a different one of the series circuits in the ON state, intermittently turning ON the other Switching element and sequentially changing the switching elements to be turned ON. More precisely, in a case where the induced voltage $V_{1u}$, $V_{1v}$, $V_{1w}$; generated in one of the phase windings which is set in the non-energized state varies in a falling direction, the upstream side transistor is continuously set in the ON state and the downstream side transistor is intermittently turned ON, and in a case where the induced voltage $V_{1u}$, $V_{1v}$, $V_{1w}$ generated in one of the phase windings which is set in the non-energized state varies in a rising direction, the upstream side transistor is intermittently turned ON and the downstream side transistor is continuously set in the ON state. This control operation is effected to precisely detect the rotation position of the rotor 42.

[2] The control section forcedly continuously sets one transistor, which is one of the transistors to be set into the ON state by the first control means and which has been kept in the ON state, in the ON state for a preset initial period (a period of 20 electrical degrees) and intermittently turns ON one transistor which is newly turned ON for the first preset initial period.

[3] The control section controls controlling the ON-OFF duty of the transistor to be intermittently turned ON by the first or second control means to adjust the speed of the brushless DC motor 1.

[4] The control section detects the rotation position of the rotor 42 based on a variation in the induced voltage $V_{1u}$, $V_{1v}$, $V_{1w}$ generated in one of the phase windings Lu, Lv, Lw which is set in the non-energized state when a second preset period (a period of 25 electrical degrees) has elapsed after the switching of energization of the phase windings Lu, Lv, Lw was effected by the first control means. More specifically, the level of the induced voltage $V_1$, $V_{1v}$, $V_{1w}$ generated in one of the phase windings Lu, Lv, Lw which is set in the non-energized state is compared with the level of the preset reference voltage vo and the rotation position of the rotor 42 is detected as the reference rotation position when the compared levels cross each other.

[5] The control section also controls the timing of switching of energization of the phase windings Lu, Lv, Lw according to the rotation position of the rotor 42 detected by the detection means to set the energization period of the phase windings Lu, Lv, Lw to a period of 120 electrical degrees.

Figure 7:
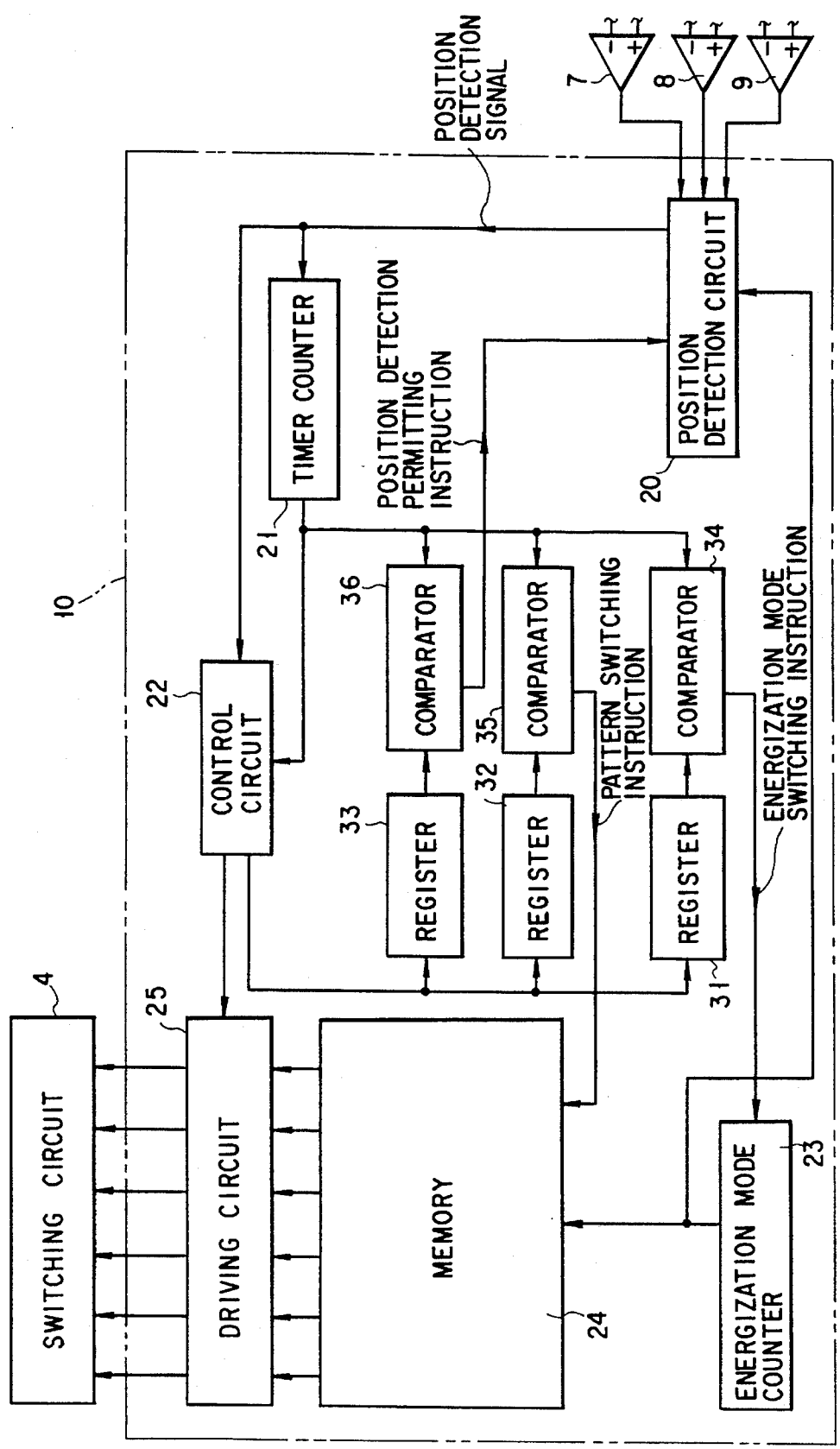
FIG. 7 is a block diagram showing a control section in the first embodiment.

The block of the control section 10 is shown in FIG. 7.

Outputs of the comparators 7, 8, 9 are input to a position detecting circuit 20. The position detecting circuit 20 selects one of the output signals of the comparators 7, 8, 9 based on the count value (corresponding to the energization mode A, B, C, D, E or F) of an energization mode counter 23 which will be described later. That is, when the phase windings Lv, Lw are energized and the phase winding Lu is set in the non-energized state, the output signal of the comparator 7 corresponding to the phase winding Lu which is set in the non-energized state is selected. When the phase windings Lw, Lu are energized and the phase winding Lv is set in the non-energized state, the output signal of the comparator 8 corresponding to the phase winding Lv which is set in the non-energized state is selected. When the phase windings Lu, Lv are energized and the phase winding Lw is set in the non-energized state, the output signal of the comparator 9 corresponding to the phase winding Lw which is set in the non-energized state is selected. Then, the position detection circuit 20 monitors a point of change of the logic level of the selected output signal (point of change from the logic "0" to "1" or from the logic "1" to "0") in a period from the time a position detection permitting instruction from a comparator 36 which will be described later is received until the count value of the energization mode counter 23 is changed (commutated). Further, when the logic level of the selected output signal is changed, the position detection circuit 20 determines that the rotor 42 is set in the reference rotation position and outputs a position detection signal.

The position detection signal output from the position detection circuit 20 is supplied to a timer counter 21 and control circuit The timer counter 21 starts a new time counting operation each time the position detection signal is received. That is, time (electrical angle) which has elapsed after the reference rotation position of the rotor 42 was detected is measured by the timer counter 21. Further, time T (corresponding to a period of 60 electrical degrees) from the time the reference rotation position of the rotor 42 is detected until a next reference rotation angle is detected is measured. The time count value of the timer counter 21 is informed to the control circuit 22.

When receiving the position detection signal from the position detection circuit 20, the control circuit 22 derives the rotation speed of the rotor 42 based on the time count value (time T) of the timer counter 21 and controls the ON-OFF duty of the ON/OFF signal output from a driving circuit 25 so as to set a difference between the derived rotation speed and a preset target speed to zero.

Further, the control circuit 22 derives a value (=T/2; corresponding to a period of 30 electrical degrees) which is half the time count value (time T) of the timer counter 21, sets the value into a register 31, derives a value (=5T/6; corresponding to a period of 50 electrical degrees) which is 5/6 times the time count value of the timer counter 21, sets the value into a register 32, derives a value (=11T/12; corresponding to a period of 55 electrical degrees) which is 11/12 times the time count value of the timer counter 21, and sets the value into a register 33.

The set value "T/2" (electrical angle of 30°) into the register 31 corresponds to the remaining period from the time the reference rotation position of the rotor 42 is detected until the switching of energization (commutation) of the phase windings Lu, Lv, Lw is effected.

The set value "5T/6" (electrical angle of 50°) into the register 32 corresponds to the sum of the remaining period (electrical angle of 30°) from the time the reference rotation position of the rotor 42 is detected until the switching of energization (commutation) of the phase windings Lu, Lv, Lw is effected and the first preset initial period (electrical angle of 20°) after the switching of energization.

The set value "11T/12" (electrical angle of 55°) into the register 33 corresponds to the sum of the remaining period (electrical angle of 30°) from the time the reference rotation position of the rotor 42 is detected until the switching of energization (commutation) of the phase windings Lu, Lv, Lw is effected and the second preset initial period (electrical angle of 25°) after the switching of energization.

The second preset initial period (electrical angle of 25°) is a period for inhibiting detection of the induced voltage $V_{1u}$, $V_{1v}$, $V_{1w}$. At the time of switching of energization of the phase windings Lu, Lv, Lw, a counter electromotive force is generated in a phase winding whose energization is to be interrupted. Because the noise by the counter electromotive force is added to the induced voltage $V_{1u}$, $V_{1v}$, $V_{1w}$, there may be a possibility that the cross point between the induced voltage $v_1$ and the reference voltage Vo cannot be correctly detected, i.e., that an error occurs in the detection of the reference rotation position of the rotor 42 may occur. Therefore, detection of the induced voltage $V_{1u}$, $V_{1v}$, $V_{1w}$ is inhibited in the second preset initial period after the switching of energization.

The set values into the registers 31, 32, 33 are compared with the time count value of the timer counter 21 by comparators 34, 35, 36, respectively.

When the time count value of the timer counter 21 has reached the set value of the register 31, an energization mode switching instruction is issued from the comparator 34. The energization mode switching instruction is supplied to the energization mode counter 23.

When the time count value of the timer counter 21 has reached the set value of the register 32, a pattern switching instruction is issued from the comparator 34. The pattern switching instruction is supplied to a memory 24.

When the time count value of the timer counter 21 has reached the set value of the register 33, a position detection permitting instruction is issued from the comparator 36. The position detection permitting instruction is supplied to the position detection circuit 20.

The energization mode counter 23 is a six-scale counter whose count value is sequentially set to one of values of "1" to "6" and counts the number of energization mode switching instructions issued from the comparator 34. The count values correspond to the six types of energization modes A, B, C, D, E and F for the respective transistors of the switching circuit 4 and are informed to the position detection circuit 20 and memory 24.

The memory 24 stores twelve types of driving signal patterns corresponding to the energization modes A0, A1, B0, B1, C0, C1, D0, D1, E0, E1, F0 and F1. One of the above memory patterns is read out according to the count value of the energization mode counter 23 and the pattern switching instruction generated from the comparator 34 and supplied to the driving circuit 25.

The driving circuit 25 outputs a driving signal for the transistors of the switching circuit 4 according to the driving signal pattern read out from the memory 24 and the instruction issued from the control circuit 22. The driving signal includes an ON signal for continuously setting the transistor in the ON state, an ON/OFF signal for intermittently turning ON the transistor, and an OFF signal for turning OFF the transistor.

Next, the operation of the above construction is explained.

Figure 8:
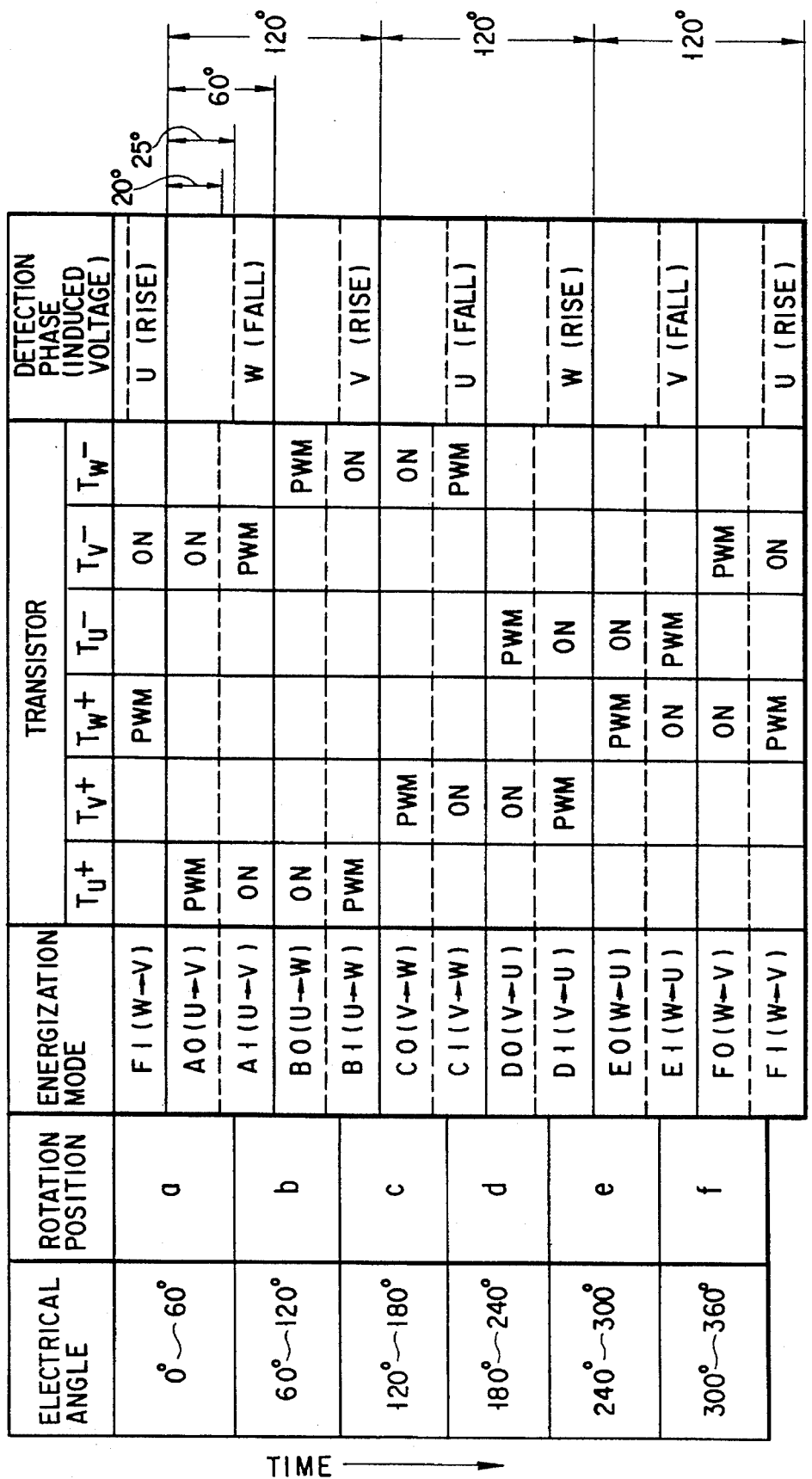
FIG. 8 is a diagram showing the relation between the rotation position of the rotor in one of the first and second embodiments and the operation states of transistors.

The relation between the energization modes A0, A1, B0, B1, C0, C1, D0, D1, E0, E1, F0 and F1 and the operation patterns of the transistors of the switching circuit 4 is shown in FIG. 8. In FIG. 8, ON indicates the operation of continuously turning-ON the transistor. Further, PWM indicates the pulse width modulation control, that is, the operation of intermittently turning-ON the transistor. In FIG. 8, the blank indicates the operation of turning-OFF of the transistor.

The waveforms of the induced voltages $v_1$ occurring in the phase windings Lu, Lv, Lw, the waveforms of currents flowing in the phase windings Lu, Lv, Lw, and the waveform of a DC current output from the DC voltage circuit 3 are shown in FIGS. 9a–9g.

First, when the count value of the energization mode counter 23 is "1", energization of the phase windings from Lu to Lv is effected (energization modes A0, A1). That is, two corresponding transistors, or the upstream side transistor $T_{u+}$ and the downstream side transistor $T_{v-}$ are turned ON and the other transistors are turned OFF.

When the magnetic fields occur in the phase windings Lu, Lv, rotation torque occurs in the rotor 42 by the interaction between the above magnetic fields and the magnetic fields created by the permanent magnets 45, thus starting the rotation of the rotor 42. At this time, the induced voltage $v_{1w}$ is induced in the phase winding Lw which is set in the non-energized state by the magnetic action caused by rotation of the permanent magnets 45.

The induced voltage $V_{1w}$ in the phase winding Lw is compared with the reference voltage Vo by the comparator 9. When the level of the induced voltage $V_{1w}$ and the level of the reference voltage Vo cross each other and the logic level of the output signal of the comparator 9 is changed, the rotation position of the rotor 42 obtained at this time is detected as the reference rotation position.

When the reference rotation position of the rotor 42 is detected, the energization mode switching instruction is issued from the comparator 34 when a period of 30 electrical degrees from the detected reference rotation position has elapsed. The count value of the energization mode counter 23 is set to "2" in response to the energization mode switching instruction.

When the count value of the energization mode counter 23 is set to "2", energization of the phase windings from Lu to Lw is effected (energization modes B0, B1). That is, two corresponding transistors, or the upstream side transistor $T_{u+}$ and the downstream side transistor $T_{w-}$ are turned ON and the other transistors are turned OFF.

When the magnetic fields occur in the phase windings Lu, Lw, rotation torque occurs in the rotor 42 by the interaction between the above magnetic fields and the magnetic fields created by the permanent magnets 45, thus causing the rotor 42 to be continuously rotated. At this time, the induced voltage $V_{1v}$ is induced in the phase winding Lv which is set in the non-energized state by the magnetic action caused by rotation of the permanent magnets 45.

The induced voltage $V_{1v}$ in the phase winding Lv is compared with the reference voltage Vo by the comparator 8. When the level of the induced voltage $v_{1v}$ and the level of the reference voltage Vo cross each other and the logic level of the output signal of the comparator 8 is changed, the rotation position of the rotor 42 obtained at this time is detected as the reference rotation position.

When the reference rotation position of the rotor 42 is detected, the energization mode switching instruction is issued from the comparator 34 when a period of 30 electrical degrees from the detected reference rotation position has elapsed. The count value of the energization mode counter 23 is set to "3" in response to the energization mode switching instruction.

When the count value of the energization mode counter 23 is set to "3", energization of the phase windings from Lv to Lw is effected (energization modes C0, C1). That is, two corresponding transistors, or the upstream side transistor $T_{v+}$ and the downstream side transistor $T_{w-}$ are turned ON and the other transistors are turned OFF.

When the magnetic fields occur in the phase windings Lv, Lw, rotation torque occurs in the rotor 42 by the interaction between the above magnetic fields and the magnetic fields created by the permanent magnets 45, thus causing the rotor 42 to be continuously rotated. At this time, the induced voltage $v_{1u}$ is induced in the phase winding Lu which is set in the non-energized state by the magnetic action caused by rotation of the permanent magnets 45.

The induced voltage $v_{1u}$ in the phase winding Lu is compared with the reference voltage Vo by the comparator 7. When the level of the induced voltage $V_{1u}$ and the level of the reference voltage Vo cross each other and the logic level of the output signal of the comparator 7 is changed, the rotation position of the rotor 42 obtained at this time is detected as the reference rotation position.

In the same manner as described above, each time a period of 30 electrical degrees elapses after the reference rotation position of the rotor 42 has been detected, the energization mode switching instruction is issued from the comparator 34 and the energization mode counter 23 repeatedly effects the counting operation from "1" to "6" in response to the energization mode switching instruction.

When the count value of the energization mode counter 23 is set to "4", energization of the phase windings from Lv to Lu is effected (energization modes D0, D1). When the count value of the energization mode counter 23 is set to "5", energization of the phase windings from Lw to Lu is effected (energization modes F0, E1). When the count value of the energization mode counter 23 is set to "6", energization of the phase windings from Lw to Lv is effected (energization modes F0, F1). After this, when the count value of the energization mode counter 23 is returned to "1", energization of the phase windings from Lu to Lv is effected (energization modes A0, A1).

Thus, the turn-ON operations of the transistors of the switching circuit 4 are sequentially changed to sequentially energize the phase windings Lu, Lv, Lw, thereby causing the rotor 42 to be continuously rotated.

The pattern switching instruction is issued from the comparator 35 each time a period of 50 electrical degrees elapses after the reference rotation position of the rotor 42 has been detected, that is, each time a period of 20 electrical degrees elapses after the energization for the phase windings Lu, Lv, Lw has been switched. In response to the pattern switching instruction, the switching timing from the energization mode A0 to the energization mode A1, switching timing from the energization mode B0 to the energization mode B1, switching timing from the energization mode C0 to the energization mode C1, switching timing from the energization mode D0 to the energization mode D1, switching timing from the energization mode E0 to the energization mode E1, and switching timing from the energization mode F0 to the energization mode F1 are determined.

In a period of the energization modes A0, A1 in which energization of the phase windings from Lu to Lv is effected, the transistor $T_{u+}$ is intermittently turned ON and the transistor $T_{v-}$ is continuously set in the ON state in the former energization mode A0 and the transistor $T_{u+}$ is continuously set in the ON state and the transistor $T_{v-}$ is intermittently turned ON in the latter energization mode A1.

In a period of the energization modes B0, B1 in which energization of the phase windings from Lu to Lw is effected, the transistor $T_{u+}$ is continuously set in the ON state and the transistor $T_{w-}$ is intermittently turned ON in the former energization mode B0 and the transistor $T_{u-}$ is intermittently turned ON and the transistor $T_{w-}$ is continuously set in the ON state in the latter energization mode B1.

In a period of the energization modes C0, C1 in which energization of the phase windings from Lv to Lw is effected, the transistor $T_{v+}$ is intermittently turned ON and the transistor $T_{w-}$ is continuously set in the ON state in the former energization mode C0 and the transistor $T_{v+}$ is continuously set in the ON state and the transistor $T_{w-}$ is intermittently turned ON in the latter energization mode C1.

In a period of the energization modes D0, D1 in which energization of the phase windings from Lv to Lu is effected, the transistor $T_{v+}$ is continuously set in the ON state and the transistor $T_{u-}$ is intermittently turned ON in the former energization mode D0 and the transistor $T_{v+}$ is intermittently turned ON and the transistor $T_{u-}$ is continuously set in the ON state in the latter energization mode D1.

In a period of the energization modes E0, E1 in which energization of the phase windings from Lw to Lw is effected, the transistor $T_{w+}$ is intermittently turned ON and the transistor $T_{u-}$ is continuously set in the ON state in the former energization mode E0 and the transistor $T_{w+}$ is continuously set in the ON state and the transistor $T_{u-}$ is intermittently turned ON in the latter energization mode E1.

In a period of the energization modes F0, F1 in which energization of the phase windings from Lw to Lv is effected, the transistor $T_{w+}$ is continuously set in the ON state and the transistor $T_{v-}$ is intermittently turned ON in the former energization mode F0 and the transistor $T_{w+}$ is intermittently turned ON and the transistor $T_{v-}$ is continuously set in the ON state in the latter energization mode F1.

Further, the position detection permitting instruction is issued from the comparator 36 each time a period of 55 electrical degrees elapses after the reference rotation position of the rotor 42 has been detected, that is, each time a period of 25 electrical degrees elapses after the energization for the phase windings Lu, Lv, Lw has been switched. According to the position detection permitting instruction, the period provided for detecting the rotation position of the rotor 42 based on the induced voltage $V_{1u}$, $V_{1v}$ is limited to the period of the energization modes A1, B1, C1, D1, E1 and F1.

The reason why the period provided for detecting the rotation position of the rotor 42 is limited to the period of the energization modes A1, B1, C1, D1, E1 and F1 is that the rotation position of the rotor 42 can be detected with high precision.

In the energization mode A1, for example, the induced voltage $v_{1w}$ occurring in the phase winding Lw varies in a falling direction. By taking this into consideration, the upstream side transistor $T_{u+}$ is continuously set in the ON state and the downstream side transistor $T_{v-}$ is intermittently turned ON.

The phase windings Lu, Lv, Lw connected in the star connection form, and when the transistors of the switching circuit 4 are turned ON/OFF, the induced voltage $V_{1w}$ occurring in the phase winding Lw which is set in the non-energized state is made discontinuous by the turn-ON/OFF operation. At this time, if the transistor which is intermittently turned ON is the transistor $T_{v-}$, the induced voltage $V_{1w}$ occurring in the phase winding Lw is intermittently pulled in the rising direction which is opposite to its original falling direction.

The intersection between the induced voltage $v_{1w}$ and the reference voltage Vo is obtained by a variation in the induced voltage $V_{1w}$ in the falling direction. Therefore, if a state in which the induced voltage $v_{1w}$ is intermittently pulled in the rising direction when the induced voltage $V_1$ varies in the falling direction is created, the intersection between the induced voltage $v_{1w}$ and the reference voltage Vo can be stably attained irrespective of the intermittent variation in the induced voltage $V_{1w}$.

Further, in the energization mode B1, for example, the induced voltage $V_{1v}$ occurring in the phase winding Lv varies in a rising direction. By taking this into consideration, the upstream side transistor $T_{u+}$ is intermittently turned ON and the downstream side transistor $T_{w-}$ is continuously set in the ON state.

At this time, if the transistor which is intermittently turned ON is the transistor $T_{u+}$, the induced voltage $v_{1v}$ occurring in the phase winding Lv is intermittently pulled in the falling direction opposite to its own rising direction.

The intersection between the induced voltage $v_{1v}$ and the reference voltage Vo is obtained by a variation in the induced voltage $V_{1v}$ in the falling direction. Therefore, if a state in which the induced voltage $v_{1v}$ is intermittently pulled in the falling direction when the induced voltage $v_{1v}$ varies in the rising direction is created, the intersection between the induced voltage $v_{1v}$ and the reference voltage Vo can be stably attained irrespective of the intermittent variation in the induced voltage $v_{1v}$.

That is, in the period of A1, C1, E1 in which the induced voltage $v_{1v}$ occurring in one of the phase windings which is set in the non-energized state varies in the falling direction, the upstream side transistor is continuously set in the ON state and the downstream side transistor is intermittently turned ON. In the period of B1, D1, F1 in which the induced voltage $V_{1u}$, $V_{1v}'$, $V_{1w}$ occurring in one of the phase windings which is set in the non-energized state varies in the rising direction, the upstream side transistor is intermittently turned ON and the downstream side transistor is continuously set in the ON state. By this control operation, the rotation position of the rotor 42 can be precisely detected.

The energization modes A0, B0, C0, D0, E0, F0 are set in the front stage of the energization modes A1, B1, C1, D1, E1, F1. In the energization modes A0, B0, C0, D0, E0, F0, the transistor which is one of the two transistors to be turned ON and which is kept in the ON state before the switching of energization is continuously set in the ON state.

For example, in the energization mode C0, the transistors $T_{v+}$, $T_{w-}$ are to be turned ON and the transistor $T_{v+}$ is intermittently turned ON and the transistor $T_{w-}$ is continuously set in the ON state. The continuous ON operation of the transistor $T_{w-}$ is continued from the energization mode B1 effected before the switching of energization.

In the energization mode D0, the transistors $T_{v+}$, $T_{u-}$ are to be turned ON and the transistor $T_{v+}$ is continuously set in the ON state and the transistor $T_{u-}$ is intermittently turned ON. The continuous ON operation of the transistor $T_{v+}$ is continued from the energization mode C1 effected before the switching of energization.

The reason why the energization modes A0, B0, C0, D0, E0, F0 are provided is as follows.

An apparatus in which the comparator 35 and register 32 for generating the pattern switching instruction are removed as shown in FIG. 10 is considered.

Figure 11:
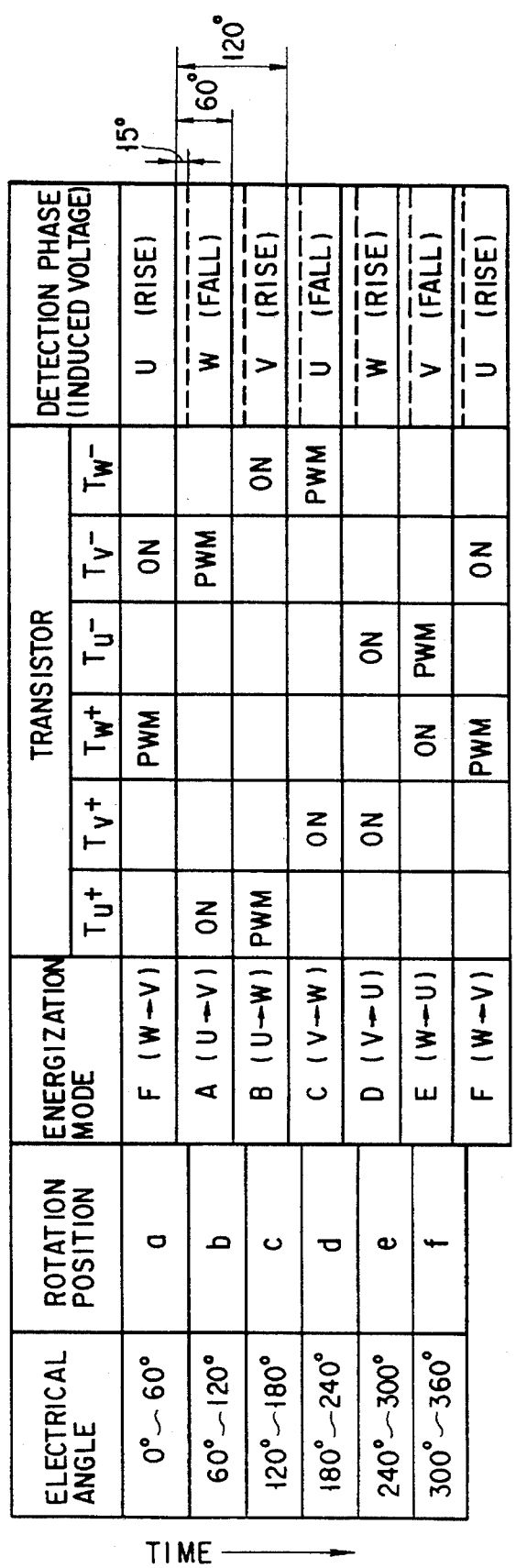
FIG. 11 is a diagram showing the relation between the rotation position of the rotor in the case of FIG. 12 and the operation states of transistors.
Figure 12:
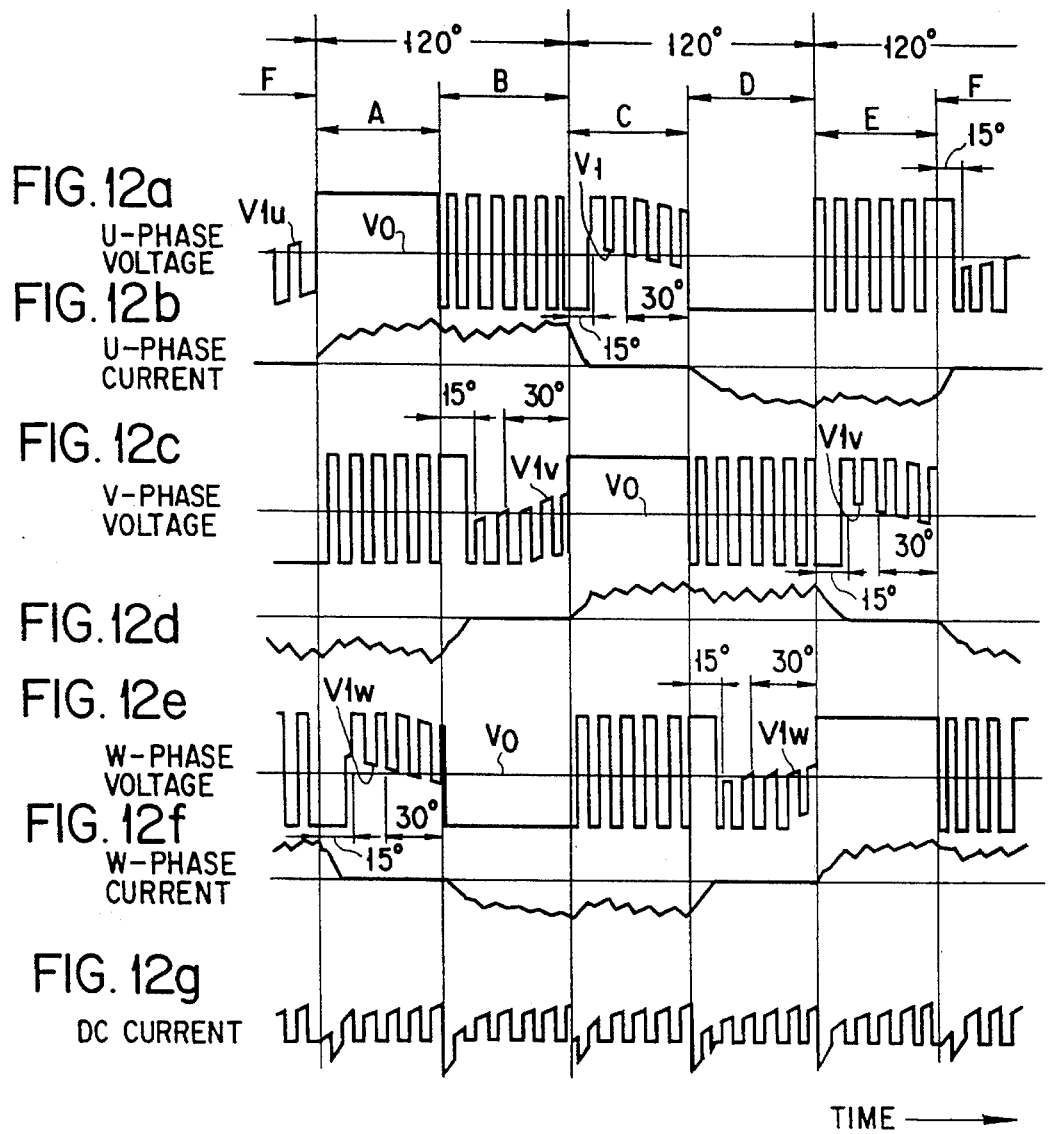
FIG. 12a–12g are signal waveform diagrams illustrating the operation effected in the case of FIG. 10.

In this case, as shown in FIG. 11, only the energization modes A, B, C, D, E, F corresponding to the energization modes A1, B1, C1, D1, E1, F1 in the first embodiment are present and experimental data shown in FIGS. 12a–12g are obtained.

As is clearly seen from FIGS. 12a–12g in the first OFF period of a transistor which starts the intermittent ON operation after the switching of energization, a DC current flowing from the DC voltage circuit 3 into the switching circuit 4 significantly varies in a negative direction. That is, a current reversely flows from the switching circuit 4 to the DC voltage circuit 3. The reverse flow of current has a bad influence on the service life of the electrical parts of the DC voltage circuit 3 and reduces the rotation torque of the brushless DC motor 1. When the rotation torque of the brushless DC motor 1 is reduced, the operation efficiency of the brushless DC motor 1 is lowered and a large noise or vibration is generated from the brushless DC motor 1.

For example, the transistor $T_{u+}$ is intermittently turned ON and the transistor $T_{w-}$ is continuously set in the ON state in the energization mode B. After this, when the energization mode is switched into the energization mode C, the transistor $T_{v+}$ which has been set in the OFF state in the former energization mode B is newly turned ON and continuously set in the ON state and the transistor $T_{w-}$ which has been continuously set in the ON state starts to be intermittently turned ON.

Figure 13:
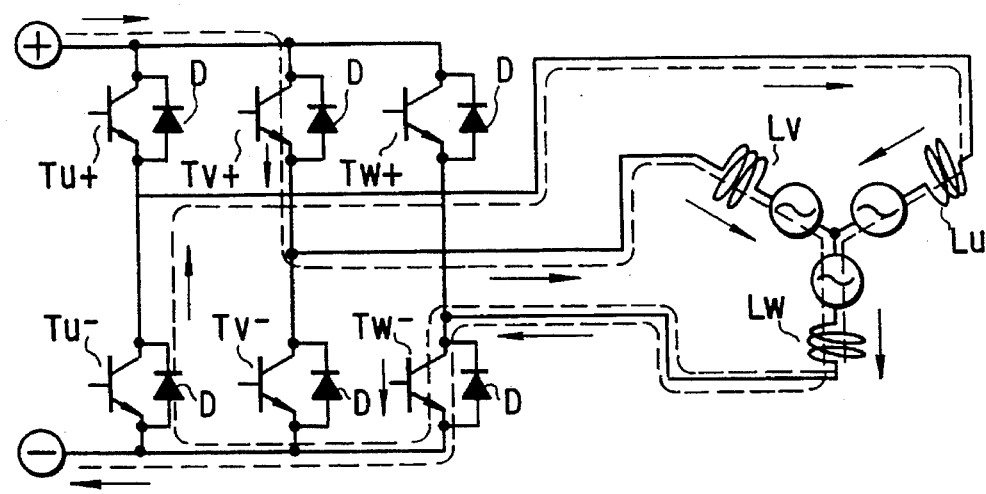
FIG. 13 is a diagram illustrating currents flowing between the switching elements and the respective phase windings in the case of FIG. 10.

In the ON period of the transistor $T_{w-}$ which starts to be intermittently turned ON, a current flows from the positive side output terminal (+) of the DC voltage circuit 3 to the negative side output terminal (−) of the DC voltage circuit 3 via the transistor $T_{v+}$, phase winding Lv, phase winding Lw and transistor $T_{w-}$ as shown in FIG. 13 and part of the current flowing from the transistor $T_{w-}$ into the negative side output terminal (−) passes through the flywheel diode D lying beside the transistor $T_{u-}$, flows through the phase winding Lu and is combined with the current flowing in the phase winding Lw.

Figure 14:
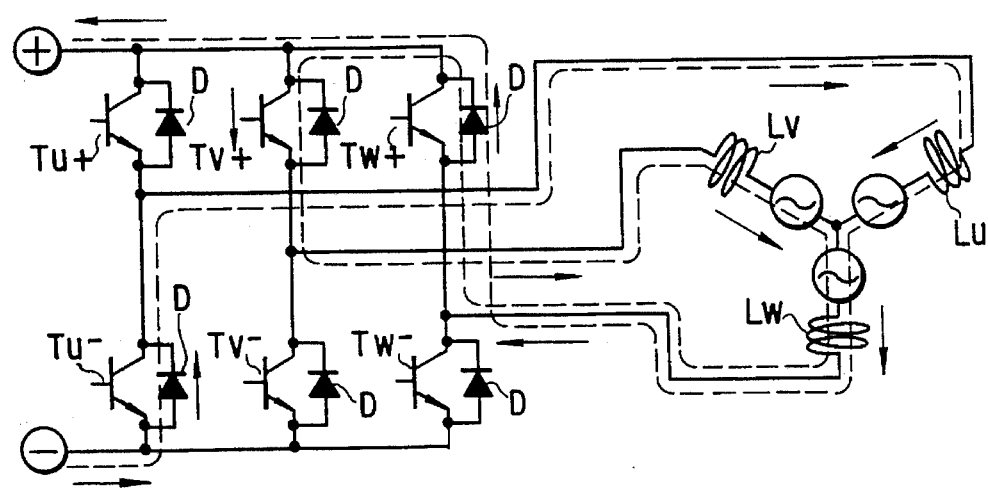
FIG. 14 is a diagram illustrating reverse currents occurring in the case of FIG. 10.

In the OFF period of the transistor $T_{w-}$, as shown in FIG. 14, the current flowing through the flywheel diode D lying beside the transistor $T_{u-}$ and flowing into the phase windings Lu, Lw in the ON period has no definite destination to reach and it flows into the positive side output terminal (+) via the flywheel diode D lying beside the transistor $T_{w+}$. As a result, current flow occurs from the negative side output terminal (−) into the flywheel diode D lying beside the transistor $T_{u-}$. That is, the above current flow is the reverse flow of the current.

Figure 15:
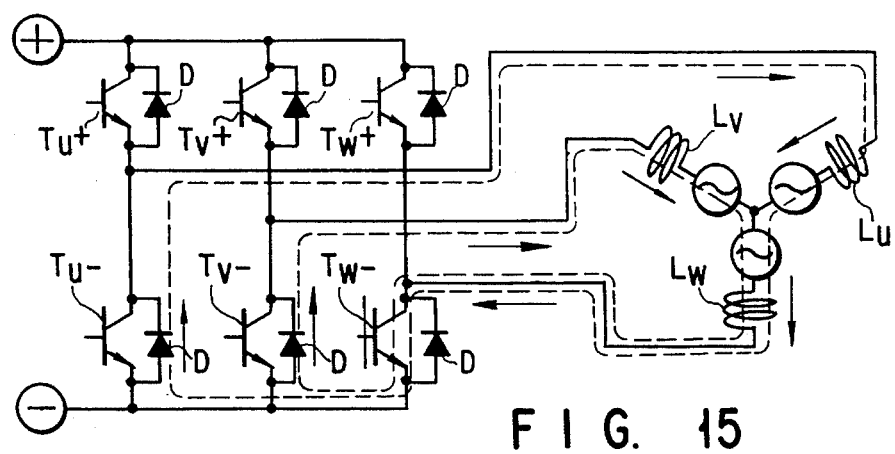
FIG. 15 is a diagram illustrating currents flowing between the switching elements and the respective phase windings in the first and second embodiments.

In order to prevent the reverse current, it is only necessary to provide the energization mode C0 as in the first embodiment of this invention. In the energization mode C0, the transistor $T_{w-}$ is not intermittently turned ON but is continuously set in the ON state and a return path of current is created as shown in FIG. 15.

That is, the current flowing into the phase windings Lu, Lw via the flywheel diode D lying beside the transistor $T_{u-}$ further flows into the flywheel diode D lying beside the transistor $T_{u-}$ via the transistor $T_{w-}$ which is continuously set in the ON state to form a loop line. Further, part of the current flowing through the transistor $T_{w-}$ flows into the flywheel diode D lying beside the transistor $T_{v-}$ and is combined with the current flowing into the phase winding Lw via the phase winding Lv to form a loop line.

Figure 9:
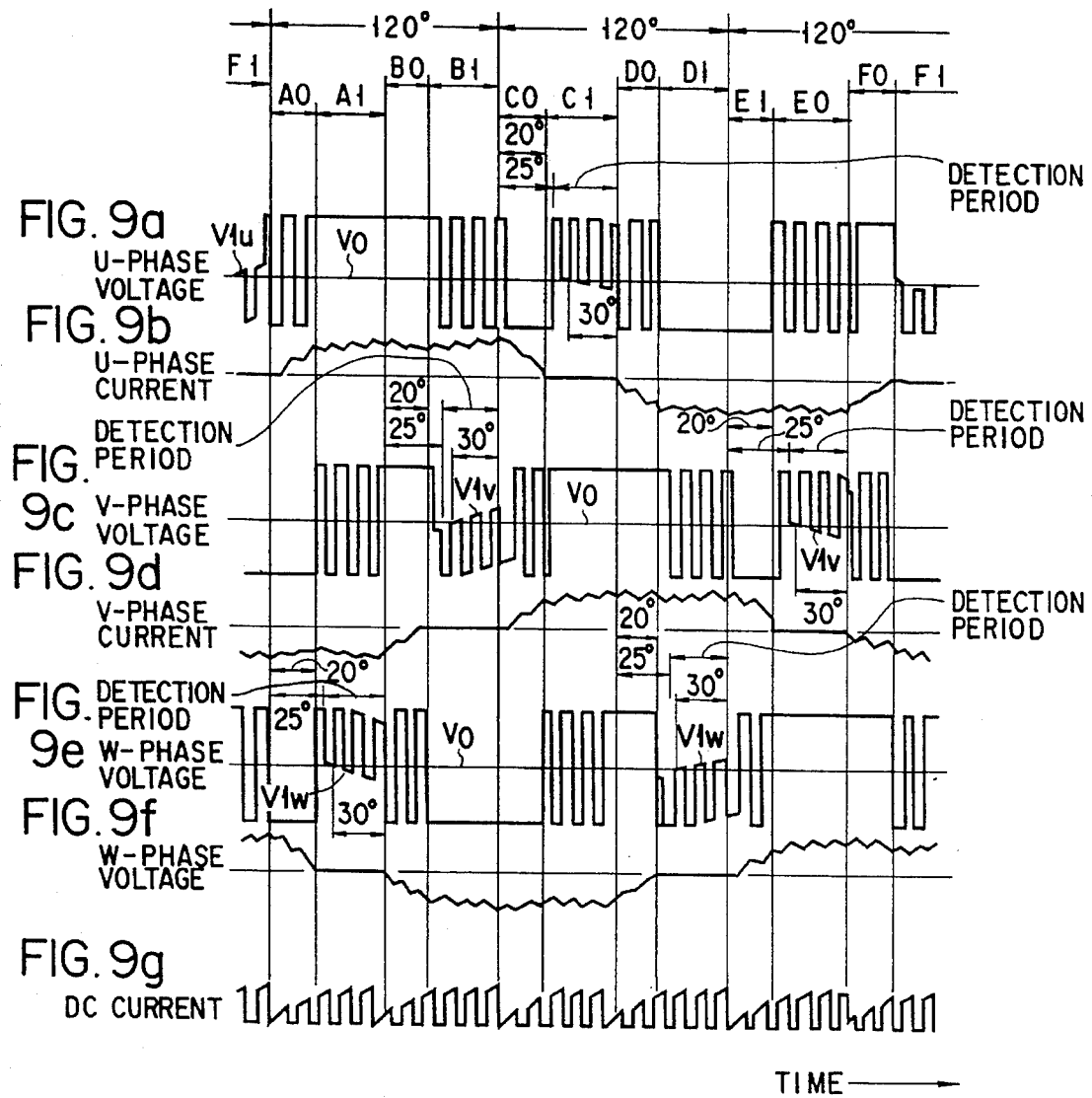
FIGS. 9a–9g are signal waveform diagrams for illustrating the operation of the first embodiment.

By passing the current in a loop-form path in the switching circuit 4, the degree of fluctuation of the DC current flowing from the DC voltage circuit 3 to the switching circuit 4 in the negative direction can be suppressed as is clearly seen from FIG. 9. That is, occurrence of reverse current flow from the switching circuit 4 to the DC voltage circuit 3 can be suppressed to minimum.

Therefore, the bad influence on the service life of the electrical parts of the DC voltage circuit 3 can be eliminated, reduction in the rotation torque of the brushless DC motor 1 can be prevented, the operation efficiency of the brushless DC motor 1 can be enhanced and generation of noise and vibration of the brushless DC motor 1 can be suppressed.

Further, because the transistor $T_{v+}$ which is newly turned ON is intermittently turned ON even if the transistor $T_{w-}$ is kept in the ON state in the energization mode C0, no problem occurs in the speed control process of the brushless DC motor 1.

Figure 16:
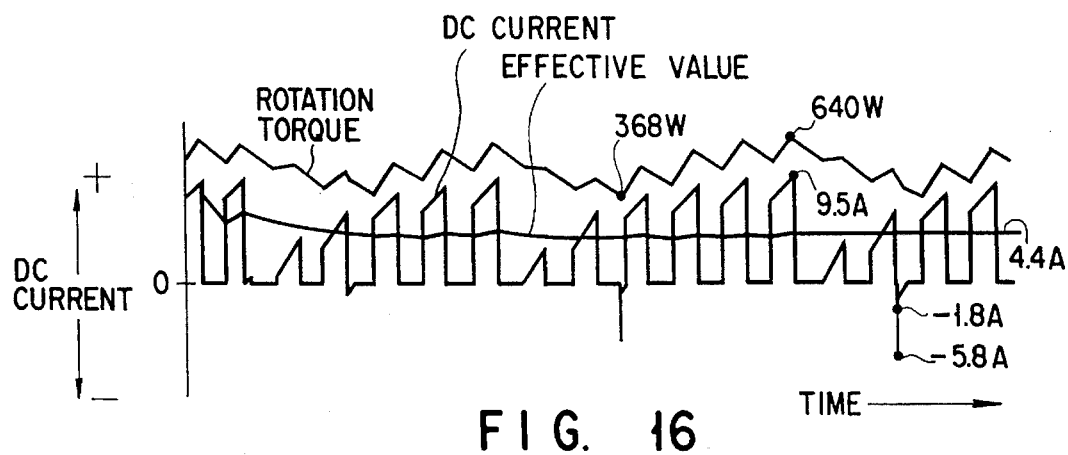
FIG. 16 is a diagram showing the relation between the current waveform and the rotation torque of the brushless DC motor in the first and second embodiments.
Figure 17:
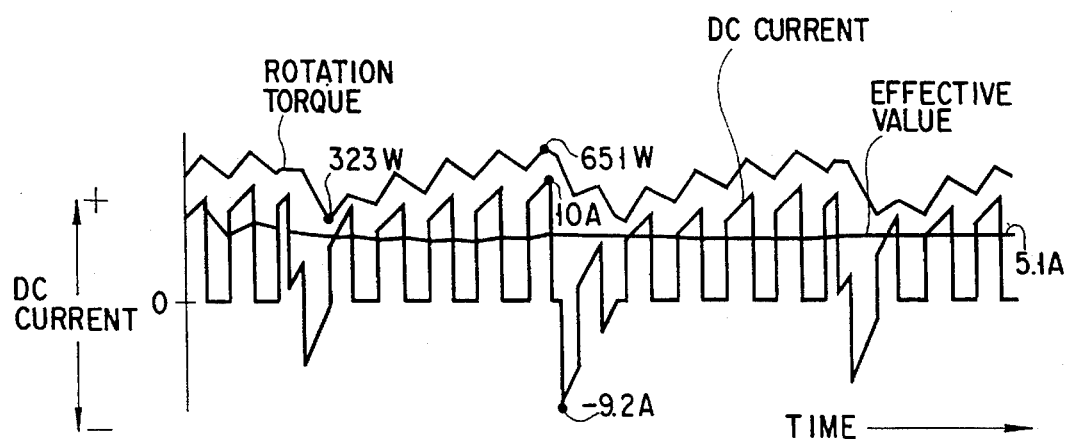
FIG. 17 is a diagram showing the relation between the current waveform and the rotation torque of the brushless DC motor in the case of FIG. 12.

The waveform of the DC current flowing from the DC voltage circuit 3 into the switching circuit 4, the effective value of the DC current, and variation in the rotation torque (instantaneous electric power) of the brushless DC motor 1 are indicated in an enlarged form in FIG. 16. Also, in FIG. 10, the waveform of the DC current, the effective value of the DC current, and variation in the rotation torque (instantaneous electric power) of the brushless DC motor 1 are indicated in an enlarged form in FIG. 17.

A period of 5 electrical degrees is provided in a period from the time the energization mode is switched from the energization mode C0 to the energization mode C1 until detection of the rotation position of the rotor 42 is started. The reason for this is as follows.

At the time of switching of the energization, a counter electromotive force generated in the phase winding whose energization is to be interrupted is added as a noise to the induced voltage $V_1$. Superposition of the noise has a bad influence on detection of the rotation position of the rotor 42. Therefore, detection of the rotation position of the rotor 42 is inhibited in a period of 5 electrical degrees from the switching of energization.

Further, energization of the phase windings Lu, Lv, Lw can be separately effected in three divided periods of 120 electrical degrees. In the period of 120 electrical degrees, the energization is intermittently effected in the initial preset period (electrical angle of 20°), the energization is continuously effected in the next preset period (electrical angle of 60°), and the energization is intermittently effected in the last preset period (electrical angle of 40°).

In the first embodiment, the period of the energization modes A0, B0, C0, D0, E0, F0 is fixedly set to an period of 20 electrical degrees and the period of the energization modes A1, B1, C1, D1, E1, F1 is fixedly set to an period of 25 electrical degrees, but the periods of the energization modes may be determined by a different method.

As an example in which the periods of the energization modes are determined by a different method, the following second method is provided.

Figure 18:
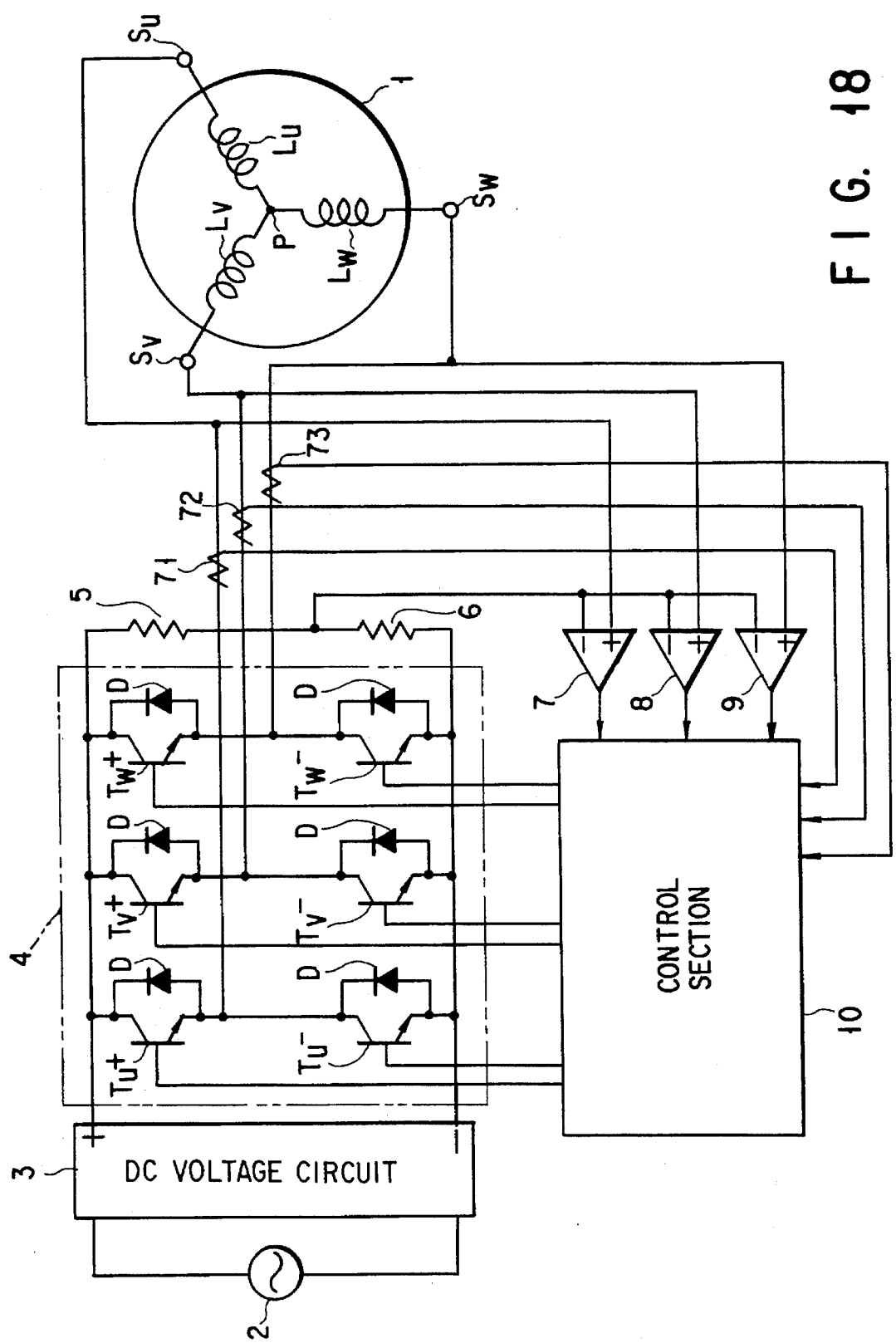
FIG. 18 is a block diagram showing an electric circuit of the second embodiment of this invention.
Figure 19:
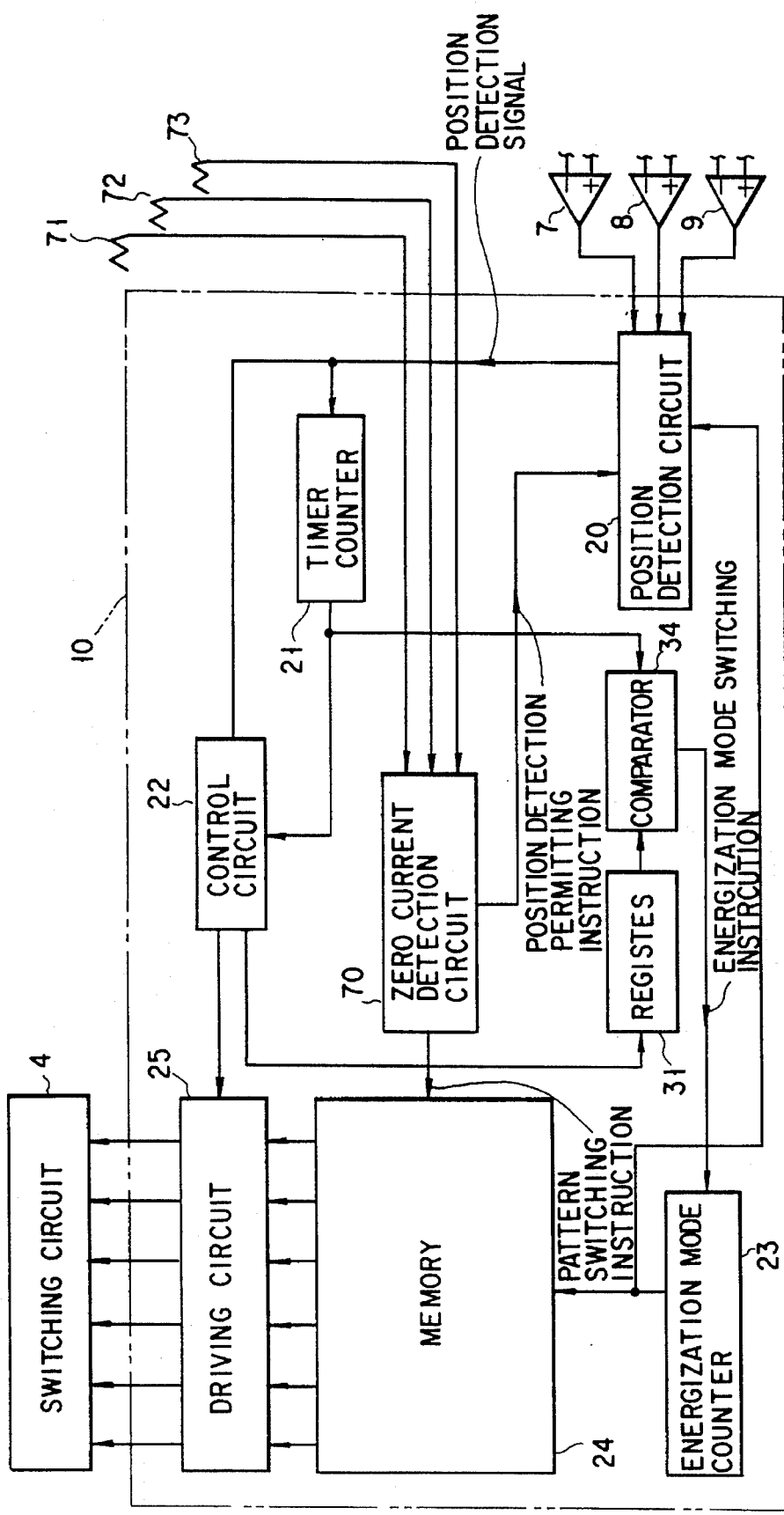
FIG. 19 is a concrete block diagram showing a control section in the second embodiment.
Figure 20:
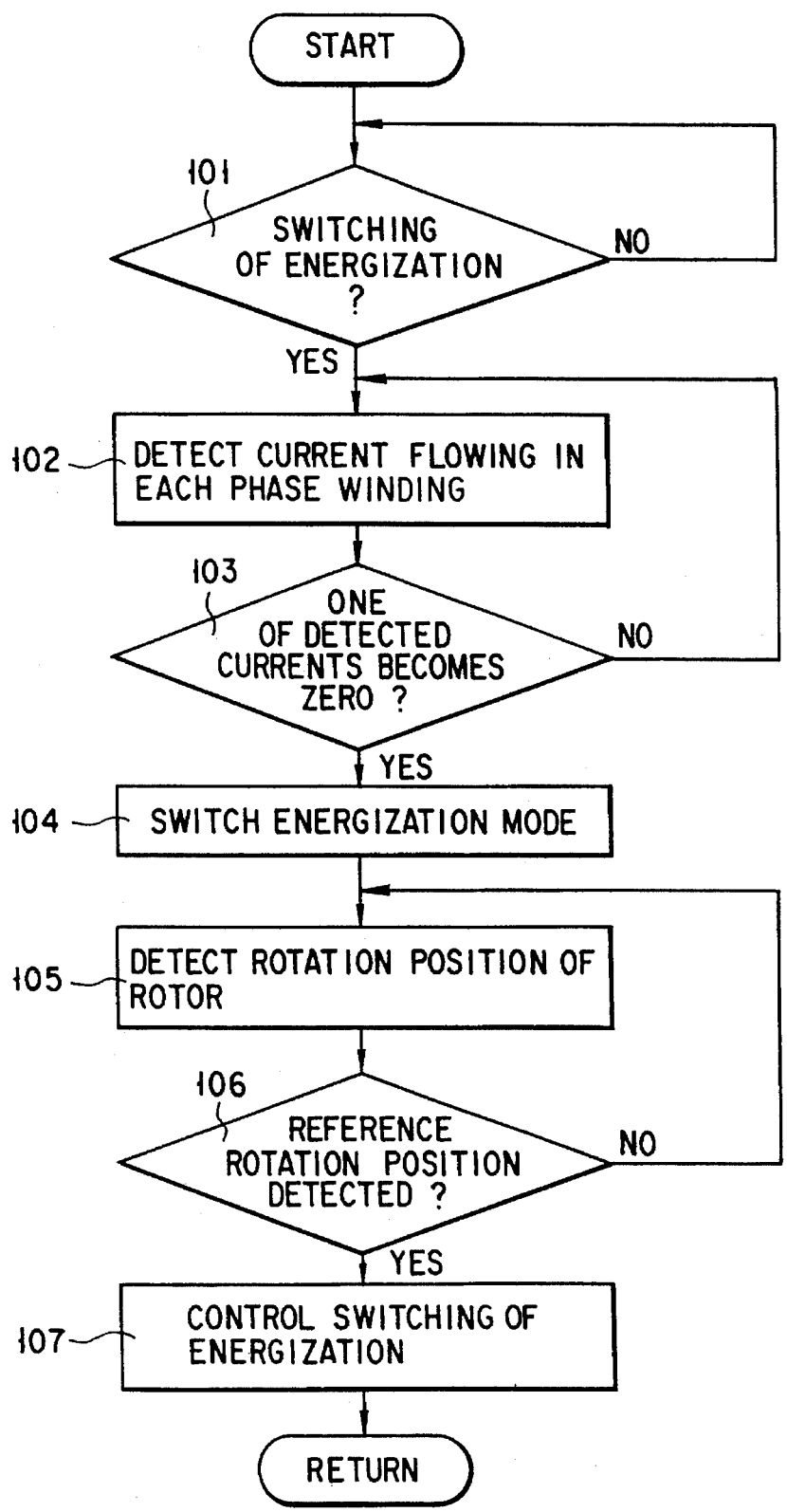
FIG. 20 is a flowchart illustrating the operation of the second embodiment.

In the second embodiment, current detectors 71, 72, 73 are respectively provided on connection lines between a switching circuit 4 and phase windings Lu, Lv, Lw as shown in FIG. 18. Detection outputs of the current detectors 71, 72, 73 are input to a control section 10.

The control section 10 includes a zero current detection circuit 70 instead of the registers 32, 33 and comparators 35, 36 in the first embodiment. The zero current detection circuit 70 monitors detection currents of the zero current detection circuits 71, 72, 73 and issues a pattern switching instruction and position detection permitting instruction when any one of the detection currents is set to zero. Like the first embodiment, the pattern switching instruction is input to a memory 24. Like the first embodiment, the position detection permitting instruction is input to a position detection circuit 20. The other construction is the same as that of the first embodiment.

The operation of the second embodiment is explained with reference to FIGS. 20 and 21a–21f.

When energization of the phase windings Lu, Lv, Lw is switched ("YES" in the step 101), currents flowing in the phase windings Lu, Lv, Lw are detected by the current detectors 71, 72, 73 (step 102).

When any one of the detection currents of the current detectors 71, 72, 73 is set to zero ("YES" in the step 103), the pattern switching instruction and position detection permitting instruction are issued from the zero current detection circuit 70.

In response to the pattern switching instruction, the energization modes A0, B0, C0, D0, E0, F0 are respectively switched to the energization modes A1, B1, C1, D1, E1, F1 (step 104). In response to the position detection permitting instruction, detection of the rotation position of the rotor 42 is started (step 105).

When the reference rotation position of the rotor 42 is detected ("YES" in the step 106), control for the switching of energization is effected (step 107). That is, energization of the phase windings Lu, Lv, Lw is switched when a period of 30 electrical degrees has elapsed after the reference rotation position of the rotor 42 was detected.

For example, in periods of the energization modes C0, C1 in FIGS. 21a–21f, a current flows in the phase winding Lu in which the induced voltage $V_{1u}$ is to be detected and the current varies towards zero. When the current flowing in the phase winding Lu thus changes towards zero, the voltage $v_{1u}$ occurring in the phase winding Lu remains on the detection side of the induced voltage. When the current flowing in the phase winding Lu has reached zero, the voltage $V_{1u}$ occurring in the phase winding Lu temporarily changes to the non-detection side of the induced voltage and then intermittently changes towards the detection side again.

Therefore, the rotation position of the rotor 42 can be stably detected by switching the energization mode from the energization mode C0 to the energization mode C1 in synchronism with the timing at which the current flowing in the phase winding Lu becomes zero.

For example, in periods of the energization modes D0, D1 in FIGS. 21a–21f, a current flows in the phase winding Lw in which the induced voltage $v_{1w}$ is to be detected and the current varies towards zero. When the current flowing in the phase winding Lw thus changes towards zero, the voltage $V_{1w}$ occurring in the phase winding Lw remains on the detection side of the induced voltage. When the current flowing in the phase winding Lw has reached zero, the voltage $V_{1w}$ occurring in the phase winding Lw temporarily changes to the non-detection side of the induced voltage and then intermittently changes towards the detection side again.

Therefore, the rotation position of the rotor 42 can be stably detected by switching the energization mode from the energization mode D0 to the energization mode D1 in synchronism with the timing at which the current flowing in the phase winding Lw becomes zero.

In the first and second embodiments, transistors are used as the switching elements in the switching circuit 4, but other elements may be used to serve the same purpose.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An apparatus for a brushless DC motor which includes a stator having three phase windings and a rotor having magnets, comprising:

a switching circuit including three series circuits, each of said three series circuits including a pair of switching elements connected in series such that a connector node is defined between said pair of switching elements, each of said connection nodes being connected to a corresponding one of said phase windings, wherein each pair of switching elements includes a first switching element connected on an upstream side of said phase windings and a second switching element connected on a downstream side of said phase windings with respect to current flow through said phase windings;

a DC voltage circuit for outputting a DC voltage to said three series circuits; and a control section for:

i) sequentially selecting and energizing said phase windings by setting one of said first switching elements in a first series circuit and one of said second switching elements in a second series circuit in an ON state, while intermittently turning ON said second switching element in said first series circuit and said first switching element in said second series circuit, and sequentially selecting, while said DC motor is operating, other switching elements in said three series circuits to be placed in an ON state and correspondingly switching elements to be intermittently turned on, ii) upon turning on said first switching element in said first series circuit and said second switching element in said second series circuit, maintaining said first switching element in said first series circuit and said second switching element in said second series circuit in said ON state for a first preset initial period of time, while intermittently turning ON said second switching element in said first series circuit and said first switching element in said second series circuit, which has not yet been set in said ON state, for said first preset initial period of time, iii) controlling an ON/OFF duty of said switching elements to be intermittently turned ON to adjust a speed of said brushless DC motor, iv) detecting a rotational position of said rotor according to a variation in an induced voltage occurring in one of said phase windings which is set in a non-energized state, v) controlling a timing of switching of an energization of said phase windings according to said detected rotation position, vi) comparing a level of an induced voltage occurring in one of said phase windings which is set in said non-energized state with a level of a preset reference voltage and detecting said rotational position of said rotor as a reference rotation position when said level of said induced voltage corresponds to said level of said preset reference voltage, vii) maintaining one of said first switching elements in said ON state and intermittently turning ON one of said second switching elements in a case where said induced voltage occurring in one of said phase windings, which is set in a non-energized state, varies in a falling direction, and viii) intermittently turning ON one of said first switching elements and maintaining one of said second switching elements in said ON state in a case where said induced voltage occurring in one of said phase windings, which is set in said non-energized state, varies in a rising direction.

2. An apparatus for a brushless DC motor which includes a stator having three phase windings and a rotor having magnets, comprising:

a switching circuit including three series circuits, each of said three series circuits including a pair of switching elements connected in series such that a connector node is defined between said pair of switching elements, each of said connection nodes being connected to a corresponding one of said phase windings, wherein each pair of switching elements includes a first switching element connected on an upstream side of said phase windings and a second switching element connected on a downstream side of said phase windings with respect to current flow through said phase windings;

a DC voltage circuit for outputting a DC voltage to said three series circuits;

current detection means for detecting a current flowing in one of said phase windings which is set in a non-energized state;

detection means for detecting a rotational position of said rotor according to a variation in an induced voltage occurring in one of said phase windings which is set in said non-energized state after switching of energization of said phase windings is effected and one of said currents detected by said current detection means becomes zero; and a control section for; and i) sequentially selecting and energizing said phase windings by setting said first switching elements in a first series circuit and said second switching element in a second series circuit in an ON state, while intermittently turning ON said second switching element in said first series circuit and said first switching element in said second series circuit, and sequentially selecting, while said DC motor is operating, other switching elements in said three series circuits to be placed in an ON state and correspondingly switching elements to be intermittently turned on, ii) upon turning on said first switching element in said first series circuit and said second switching element in said second series circuit, maintaining said first switching element in said first series circuit and said second switching element in said second series circuit in said ON state for a first preset initial period of time, while intermittently turning ON said second switching element in said first series circuit and said first switching element in said second series circuit, which has not yet been set in said ON state, for said first preset initial period of time, iii) said first preset initial period of time corresponding to a period of time from said switching of energization of said phase windings is effected until one of said currents detected by said current detection means becomes zero, controlling an ON/OFF duty of said switching elements to be intermittently turned ON to adjust a speed of said brushless DC motor, and controlling a timing of switching of energization of said phase windings by said first control means according to a rotation position detected by said detection means.

3. An apparatus according to claim 2, wherein said detection means compares said level of an induced voltage occurring in one of said phase windings which is set in said non-energized state with a level of a preset reference voltage and detects said rotation position of said rotor as a reference rotation position when said level of said induced voltage and said level of said level of said preset reference voltage cross each other.

4. An apparatus according to claim 3, wherein said control section maintains one of said first switching elements in said ON state and intermittently turns ON one of said second switching elements in a case where said induced voltage occurring in one of said phase windings, which is set in said non-energized state, varies in a falling direction and intermittently turns ON one of said first switching elements and maintains one of said second switching elements in said ON state in a case where said induced voltage occurring in one of said phase windings, which is set in said non-energized state, varies in a rising direction.

* * * * *